(12) United States Patent
Bahou

(10) Patent No.: US 7,699,707 B2
(45) Date of Patent: Apr. 20, 2010

(54) FANTASY SPORTS SYSTEM AND METHOD THEREOF

(75) Inventor: Tarek Bahou, Haworth, NJ (US)

(73) Assignee: Hotbox Sports LLC, Haworth, NJ (US)

( * ) Notice: Subject to any disclaimer, the term of this patent is extended or adjusted under 35 U.S.C. 154(b) by 248 days.

(21) Appl. No.: 11/429,349

(22) Filed: May 8, 2006

(65) Prior Publication Data

US 2006/0252476 A1 Nov. 9, 2006

Related U.S. Application Data

(60) Provisional application No. 60/678,792, filed on May 9, 2005, provisional application No. 60/709,421, filed on Aug. 19, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/42; 463/1; 463/4; 463/9; 463/40; 700/91

(58) Field of Classification Search ............... 463/1, 463/40, 41, 42, 4, 9; 700/91, 92
See application file for complete search history.

(56) References Cited

U.S. PATENT DOCUMENTS

| | | | | |
|---|---|---|---|---|
| 4,918,603 A * | 4/1990 | Hughes et al. | ................. | 463/4 |
| 5,018,736 A | 5/1991 | Pearson et al. | ................. | 463/29 |
| 5,263,723 A | 11/1993 | Pearson et al. | ................. | 463/41 |
| 5,346,326 A | 9/1994 | Bienvenu | ................. | 402/79 |
| 5,788,283 A | 8/1998 | Adler | ................. | 281/38 |
| 5,830,069 A | 11/1998 | Soltesz et al. | ................. | 463/42 |
| 5,846,132 A | 12/1998 | Junkin | ................. | 463/42 |
| 5,860,862 A | 1/1999 | Junkin | ................. | 463/40 |
| 5,971,854 A * | 10/1999 | Pearson et al. | ................. | 463/41 |
| 6,135,881 A | 10/2000 | Abbott et al. | ................. | 463/3 |
| 6,170,829 B1 * | 1/2001 | Harvey | ................. | 273/298 |
| 6,193,610 B1 | 2/2001 | Junkin | ................. | 463/40 |
| 6,371,855 B1 * | 4/2002 | Gavriloff | ................. | 463/42 |

(Continued)

OTHER PUBLICATIONS

Yahoo Fantasy Baseball Rules (Head-2-Head), at http://help.yahoo.com/l/us/yahoo/baseball/rules/index.html.

(Continued)

*Primary Examiner*—Dmitry Suhol
*Assistant Examiner*—Wei Li
(74) *Attorney, Agent, or Firm*—Winston & Strawn LLP

(57) ABSTRACT

A method of playing a fantasy sport that relates to forming at least two fantasy teams, in which each team is associated with at least one actual player from an actual sport that is played over a multiple-game schedule, selecting a plurality of scoring statistics based on actual scoring statistics associated with the actual sport to measure the performance of the fantasy team, selecting a series corresponding to a portion of an actual schedule of the sport, and determining and evaluating the scoring statistics accrued by the fantasy team during the course of the selected series. The series includes a number of games that is less than the total games in the schedule of the actual sport over a season. A system and an article of manufacture for playing the fantasy sport are also provided.

16 Claims, 4 Drawing Sheets

U.S. PATENT DOCUMENTS

| | | |
|---|---|---|
| 6,415,188 B1 | 7/2002 | Fernandez et al. ............ 700/67 |
| 6,434,398 B1 | 8/2002 | Inselberg .................... 455/517 |
| 6,471,207 B1 | 10/2002 | Schlaifer ................. 273/138.1 |
| 6,650,903 B2 | 11/2003 | Inselberg .................... 455/517 |
| 6,656,042 B2 | 12/2003 | Reiss et al. .................... 463/17 |
| 6,669,565 B2 | 12/2003 | Liegey ...................... 463/42 |
| 6,688,973 B2* | 2/2004 | Satloff et al. ................... 463/1 |
| 6,760,595 B2 | 7/2004 | Inselberg .................... 455/517 |
| 6,832,178 B1 | 12/2004 | Fernandez et al. .......... 702/189 |
| 6,922,664 B1 | 7/2005 | Fernandez et al. ............ 703/13 |
| 6,961,537 B2 | 11/2005 | Rajaram .................... 455/3.01 |
| 6,975,878 B2 | 12/2005 | Inselberg .................... 455/517 |
| 6,996,413 B2 | 2/2006 | Inselberg .................... 455/517 |
| 7,001,279 B1* | 2/2006 | Barber et al. ................... 463/42 |
| 7,051,022 B1 | 5/2006 | Faisal ............................ 707/5 |
| 2001/0034635 A1 | 10/2001 | Winters ....................... 705/10 |
| 2001/0039210 A1 | 11/2001 | St.-Denis .................... 463/42 |
| 2001/0044336 A1 | 11/2001 | Reiss et al. .................... 463/17 |
| 2002/0029381 A1 | 3/2002 | Inselberg ........................ 725/9 |
| 2002/0034980 A1 | 3/2002 | Lemmons et al. ............ 463/40 |
| 2002/0049783 A1 | 4/2002 | Berk et al. ............... 715/500.1 |
| 2002/0059094 A1 | 5/2002 | Hosea et al. ................... 705/10 |
| 2002/0065097 A1 | 5/2002 | Brockenbrough et al. 455/552.1 |
| 2002/0069161 A1 | 6/2002 | Eckert et al. .................. 705/38 |
| 2002/0077952 A1 | 6/2002 | Eckert et al. .............. 705/36 R |
| 2002/0077961 A1 | 6/2002 | Eckert et al. .................. 705/37 |
| 2002/0107073 A1 | 8/2002 | Binney ........................ 463/42 |
| 2002/0107590 A1 | 8/2002 | Liegey ........................ 700/91 |
| 2002/0115488 A1 | 8/2002 | Berry et al. .................... 463/42 |
| 2002/0116297 A1 | 8/2002 | Olefson ........................ 705/27 |
| 2002/0157099 A1 | 10/2002 | Schrader et al. ............... 725/51 |
| 2002/0157101 A1 | 10/2002 | Schrader et al. ............... 725/64 |
| 2002/0166123 A1 | 11/2002 | Schrader et al. ............... 725/58 |
| 2003/0004887 A1 | 1/2003 | Roszak ........................ 705/57 |
| 2003/0014277 A1 | 1/2003 | Kinney ......................... 705/1 |
| 2003/0018571 A1 | 1/2003 | Eckert et al. .................. 705/37 |
| 2003/0054885 A1 | 3/2003 | Pinto et al. .................... 463/42 |
| 2003/0055713 A1 | 3/2003 | Pinto et al. .................... 705/10 |
| 2003/0107173 A1 | 6/2003 | Satloff et al. ................. 273/292 |
| 2003/0110480 A1 | 6/2003 | Rajaram ...................... 717/140 |
| 2003/0144017 A1 | 7/2003 | Inselberg .................... 455/517 |
| 2003/0189589 A1 | 10/2003 | LeBlanc et al. ............. 715/723 |
| 2003/0203757 A1 | 10/2003 | Chanda et al. ................ 463/42 |
| 2004/0047287 A1 | 3/2004 | Tremblay et al. ........... 370/229 |
| 2004/0058697 A1 | 3/2004 | Inselberg .................... 455/517 |
| 2004/0073437 A1 | 4/2004 | Halgas et al. .................. 705/1 |
| 2004/0110552 A1 | 6/2004 | Del Prado ..................... 463/4 |
| 2004/0117831 A1 | 6/2004 | Ellis et al. ..................... 725/53 |
| 2004/0171381 A1 | 9/2004 | Inselberg ................. 455/426.2 |
| 2004/0259577 A1 | 12/2004 | Ackley ........................ 455/466 |
| 2004/0266530 A1 | 12/2004 | Bishop ........................ 463/42 |
| 2004/0266535 A1 | 12/2004 | Reeves ........................ 463/42 |
| 2005/0001837 A1 | 1/2005 | Shannon ..................... 345/440 |
| 2005/0022686 A1 | 2/2005 | Wessells et al. ............. 101/368 |
| 2005/0049731 A1 | 3/2005 | Dell ............................ 700/91 |
| 2005/0049933 A1 | 3/2005 | Upendran et al. ............. 705/26 |
| 2005/0049957 A1 | 3/2005 | Vakili et al. ................... 705/37 |
| 2005/0050022 A1 | 3/2005 | Dukes et al. ................... 707/3 |
| 2005/0050160 A1 | 3/2005 | Upendran et al. ........... 709/217 |
| 2005/0050576 A1 | 3/2005 | Upendran et al. ........... 725/110 |
| 2005/0064937 A1 | 3/2005 | Ballman ...................... 463/40 |
| 2005/0075983 A1 | 4/2005 | St.-Denis .................... 705/64 |
| 2005/0076362 A1 | 4/2005 | Dukes et al. ................. 725/46 |
| 2005/0076363 A1 | 4/2005 | Dukes et al. ................. 725/46 |
| 2005/0076364 A1 | 4/2005 | Dukes et al. ................. 725/46 |
| 2005/0076383 A1 | 4/2005 | Upendran et al. ........... 725/109 |
| 2005/0076384 A1 | 4/2005 | Upendran et al. ........... 725/109 |
| 2005/0116422 A1 | 6/2005 | Fish ............................ 273/459 |
| 2005/0137728 A1 | 6/2005 | Guagliardo ................. 700/91 |
| 2005/0159220 A1 | 7/2005 | Wilson et al. ................. 463/40 |
| 2005/0164792 A1* | 7/2005 | Wilcock ...................... 463/42 |
| 2005/0172323 A1 | 8/2005 | Yang et al. .................. 725/109 |
| 2005/0228780 A1 | 10/2005 | Diab et al. ..................... 707/3 |
| 2005/0239549 A1 | 10/2005 | Salvatore et al. ............. 463/42 |
| 2006/0010251 A1 | 1/2006 | Mrsic-Flogel et al. ....... 709/245 |
| 2006/0025208 A1 | 2/2006 | Ramsey ...................... 463/25 |
| 2006/0031106 A1 | 2/2006 | Browde ......................... 705/7 |
| 2006/0040719 A1 | 2/2006 | Plimi ........................... 463/9 |
| 2006/0041550 A1 | 2/2006 | Bennett et al. ................. 707/5 |
| 2006/0041553 A1 | 2/2006 | Paczkowski et al. ........... 707/7 |
| 2006/0041562 A1 | 2/2006 | Paczkowski et al. .......... 707/10 |
| 2006/0046807 A1 | 3/2006 | Sanchez ....................... 463/9 |
| 2006/0063519 A1 | 3/2006 | Rajaram .................... 455/419 |
| 2006/0068824 A1 | 3/2006 | Inselberg .................... 455/517 |
| 2006/0079312 A1 | 4/2006 | Penrice ....................... 463/17 |
| 2006/0085259 A1 | 4/2006 | Nicholas et al. ............... 705/14 |
| 2006/0089935 A1 | 4/2006 | Clifford et al. ................ 707/10 |
| 2006/0094409 A1 | 5/2006 | Inselberg .................. 455/414.1 |
| 2006/0095148 A1 | 5/2006 | Bowman et al. ............. 700/90 |
| 2006/0095331 A1 | 5/2006 | O'Malley et al. ............. 705/22 |
| 2006/0095344 A1 | 5/2006 | Nakfoor ....................... 705/26 |
| 2006/0100006 A1 | 5/2006 | Mitchell et al. ................ 463/9 |
| 2006/0217198 A1* | 9/2006 | Johnson ...................... 463/40 |

OTHER PUBLICATIONS

NHL—Fantasy Format, at http://benchboss.nhl.com/boss_s/displayl.asp?gameid=31&pages=rules.

Nascar—Yahoo, at http://help.yahoo.com/l/us/yahoo/racing/rules/rrules-01.html.

Fantasy Golf—Yahoo, at http://help.yahoo.com/l/us/yahoo/golf/rules/grules-01.html.

Premier League Format—ESPN, from ESPN, undated.

Fantasy Football (American), from Wikipedia, the free encyclopedia, Sep. 2006.

Examiner's Affidavit, from PCT International Search Report in International Application No. PCT/US06/17886, filed on May 9, 2006.

* cited by examiner

Communication Network System
30

FIG. 4

FULL SEASON SCHEDULE: 1 2 3 4 5 | Series 1: 6 7 8 9 10 | 11 12 13 | Series 2: 14 15 16 17 18 19 | 20 | Series 3: 21 22 23 24 25 26 27 | 28 29 30

Starting Line-up for Fantasy Team #1:
- Series 1: O'Neal, Marion, Kidd, Jamison, Camby, Simmons
- Series 2: Camby, Redd, O'Neal, Simmons, Marion
- Series 3: Marion, Jamison, Gooden, Redd, Kidd, Harrington FULL SEASON SCHEDULE (cont'd): 31 32 33 34 35 | Series 4: 36 37 | Series 5: 38 39 40 41 | 42 43 44 | Series 6: 45 46 47 48 49 | 50 51 52 53 54 | Series 7: 55 56 57 58 59 60

FULL SEASON SCHEDULE (cont'd): 61 62 63 64 65 66 | Series 8: 67 68 | Series 9: 69 70 71 72 73 | 74 75 76 | Series 10: 77 78 79 80 81

Fantasy Team 1
Roster
6 Starters (2G, 2F, 1C, 1U)
Shaquille O'Neal        C
Drew Gooden             F
Antawn Jamison          F
Michael Redd            G
Marcus Camby            F
Othella Harrington      C
Bobby Simmons           G

FANTASY SPORTS SYSTEM AND METHOD THEREOF

CROSS-REFERENCE TO PRIOR APPLICATIONS

This application claims the benefit of U.S. Provisional Application No. 60/678,792, filed on May 9, 2005, and U.S. Provisional Application No. 60/709,421, filed on Aug. 19, 2005, the disclosure of each of which is fully incorporated herein by reference.

FIELD OF THE INVENTION

The present invention relates to fantasy sports leagues, and the software used in a preferred embodiment, having a play feature that allows a user (e.g., a fantasy team owner) to select one or more real-life games of each player occurring during a particular time period that makes up only a portion of the season, and in particular to a fantasy game or fantasy series that spans a particular time period, and for which real-life statistics generated by each player during the selected real-life games are used to determine which fantasy team wins the particular fantasy game or fantasy series.

BACKGROUND OF THE INVENTION

Fantasy sports leagues are generally of two different types (referred to interchangeably herein as the league "format"). The first type (referred to interchangeably herein as "rotisserie" or "stat-to-stat" style) is premised on each player's cumulative statistics (interchangeably referred to herein as "scores"). The real-life (also interchangeably referred to herein as "actual") statistics of each player on each fantasy team are compiled over an entire real-life sporting season or a portion thereof. At the end of the cumulative fantasy period, typically an entire season of the actual sport, the statistics for the entire fantasy team are totaled and compared to the cumulative statistics of all of the other fantasy teams in a particular fantasy league.

Typically, multiple statistics are used in this comparison. For example, in baseball a 5×5 rotisserie league may use batting average, steals, home runs, runs, runs batted in, earned run average, saves, walks plus hits per innings pitched, strikeouts, and wins/losses. The fantasy team with the best cumulative statistics typically wins the fantasy season. For example, in a ten-team league, each team is given a point value 1 through 10 for the ranking among other teams in each statistical category, and the total point value among the statistical categories is cumulated and calculated to produce a cumulative score.

One problem with this system is that it is possible for the cumulative statistics of one fantasy team to become so large during the fantasy season that, no matter how well the players on the other fantasy teams perform throughout the remainder of the fantasy season, no other fantasy teams can win. In other words, typically teams that fall behind in the rankings early in a season are unable to make up the lost ground and there is wide variation between the leading fantasy team and the other fantasy team(s). As a result, player interest often falls, and in turn, fantasy leagues witness a drop-off in participation, such as participation in waiver wire or free agent activity, trades, and league chats and postings.

A second type of format is generally referred to herein as "head-to-head" style. In head-to-head style, the fantasy season is broken up into discrete fantasy games (e.g., weekly totals). In other words, the fantasy games are generally scheduled over regular intervals, such as a week of an actual season of the particular sport, for the duration of the season. For example, in professional American football (also referred to herein as "football"), e.g., National Football League (NFL) football, the regular interval typically consists of a 1 week interval, wherein one real game is played per week. In professional baseball, such as Major League Baseball (MLB), the regular interval may consist of a one week period including all games between Monday and the following Sunday, for example.

In head-to-head style, typically a first fantasy team plays, i.e., competes directly with, a second fantasy team (as opposed to the entire league in the rotisserie style). The scores from the first and second fantasy teams are compared, and a winner is determined from the highest statistics of those two teams, regardless of the scores of other teams in the league. In a typical head-to-head format, the head-to-head match ups change in each interval. For example, in a six team league, team 1 plays team 2, team 3 plays team 4, and team 5 plays team 6. The scores of the teams playing one another (i.e., 1 and 2) are compared to determine a winner for the interval, such as a week. The following week team 1 may play team 3 head-to-head.

The statistics of each player on each fantasy team for that interval, e.g., a particular week, are totaled. The cumulated statistics for each player on each fantasy team are then totaled to produce a fantasy team score, and the team's scores are compared to the team scores of the competing fantasy team. The fantasy team with the best team scores is declared the winner of that particular fantasy head-to-head game of that interval. Over the course of a multi-interval season, such as sixteen weeks of the entire NFL season for fantasy football, the best performing fantasy team, i.e., the fantasy team that wins the most fantasy games, is declared the winner of the fantasy league at the end of the fantasy season, or the teams enter a playoff based on regular season records, for example, if there is a tie.

However, one problem with the head-to-head style is that the statistics of some or all of the players on the first fantasy team might be low compared to the statistics of the players on a second competing fantasy team in a particular discrete period, for example, because the players on the first fantasy team may not play as many real-life games during that time interval as the second team. Therefore, the first fantasy team may lose a particular fantasy game even though the players thereon are otherwise better performing players over the course of a season than those on the opposing fantasy team, simply because the competing team's players had a more intensive real-life schedule, e.g., a larger number of real-life games over that particular time interval. The head-to-head format creates artificial and arbitrary delineations in scheduling, and therefore it is often not an accurate measure of a fantasy team's overall value.

Although the head-to-head format provides fantasy players with relatively quick results, as well as frequent results for each defined time interval, the head-to-head format has a tendency to dissipate interest of a fantasy team owner because of the inherent inequalities that tend to exist using artificial fantasy schedules and match ups, which may result in a fantasy team rapidly falling out of contention while still needed to slog through the entire season of the fantasy sport.

Thus, both the head-to-head and rotisserie formats suffer from an inability to keep certain fantasy players' attention. Waning attention in the rotisserie format is largely attributable to the large number of games that the fantasy team owner must monitor over the course of a sport season and throughout the discrete period (i.e., interval) over which the players' statistics are accumulated, while in the head-to-head format, lost interest is typically attributable to the artificial boundaries of the schedule, which can cause unrealistic variations in fantasy performance despite solid performance on the real athletic field.

In view of the above weaknesses inherent in the existing head-to-head and rotisserie formats, there is a need for a fantasy sports system and method of playing thereof to allow for discrete fantasy games or fantasy series that are more representative of the actual players' performance while engaging and retaining the interest of fantasy team owners to utilize managing skills during fantasy play. In addition, there is an unmet need in the art to provide a fantasy sports system that involves a greater amount of knowledge of the real-life sport.

SUMMARY OF THE INVENTION

The present invention advantageously provides a system and method to maintain the interest of fantasy participants (also referred to herein as "fantasy owners," "owners," or "managers") in their fantasy teams and to provide discrete intervals (interchangeably referred to herein as "series" or "fantasy period") of scoring and results. The present invention also preferably provides a manual and automated system of scoring and generally evaluating the performance of each fantasy team in real-time or near real-time. More specifically, the present invention relates to a system and method of providing head-to-head style fantasy competition between teams over a plurality of discrete head to head series, which are cumulatively shorter than the regular season of the actual sport. Moreover, the present invention allows the owner of the each owner in a fantasy league to select one or more actual games for each player on a fantasy team in a discrete period (i.e., series) as the accumulated scoring for that player. For each player on the fantasy team, the accumulated total is aggregated and a total team score is generated and compared to the total team score for each other fantasy team directly competing that period. The team with the bigger score is deemed the winner of that period.

The present invention is related to a method of playing a fantasy sport that includes: 1) forming at least two fantasy teams, each team associated with at least one actual player from an actual sport that is played over a multiple-game schedule; 2) selecting a plurality of scoring statistics based on actual scoring statistics associated with the actual sport to measure the performance of the fantasy team; 3) selecting a series corresponding to a portion of an actual schedule of the sport; and 4) determining and evaluating the scoring statistics accrued by the fantasy team during the course of the selected series, wherein series comprises a number of games and the portion in all the selected series is less than the total games in the schedule of the sport over a season.

The present invention is also directed to a system for playing a fantasy sport. A processing system is configured and adapted to communicate with a plurality of computers, wherein the processing system is arranged to accept input of: a real-life sport selection having a multiple game schedule, a plurality of players each of which forms a fantasy team each including at least one actual player from the actual sport selected, a selection of a plurality of scoring statistic categories based on actual types of scoring statistic categories associated with the actual sport to measure the performance of the fantasy team, a selection of a number of series corresponding to an actual yearly schedule of the sport, and optionally a selection of a number of games in each series, wherein the processing system calculates fantasy scoring statistics based on the actual scoring statistic categories accrued by the fantasy team over the at least one series.

Moreover, the present invention is direct to a system for playing a fantasy sport including a processing system configured and adapted to communicate with a plurality of computers. The processing system is arranged to accept input of: a real-life sport selection having a multiple game schedule; a plurality of players each of which forms a fantasy team each including at least one actual player from the actual sport selected; a selection of a plurality of scoring statistic categories based on actual types of scoring statistic categories associated with the actual sport to measure the performance of the fantasy team; a selection of a number of series corresponding to an actual yearly schedule of the sport; and optionally a selection of a number of games in each series, wherein the processing system calculates fantasy scoring statistics based on the actual scoring statistic categories accrued by the fantasy team over the at least one series.

The present invention is further directed to an article of manufacture including: a computer readable medium and a data structure stored thereon adapted and configured to route signals. The data structure includes a computer readable system for playing a fantasy sport including a processing system configured and adapted to communicate with a plurality of computers. The processing system is arranged to accept input of: a real-life sport selection having a multiple game schedule; a plurality of players each of which forms a fantasy team each including at least one actual player from the actual sport selected; a selection of a plurality of scoring statistic categories based on actual types of scoring statistic categories associated with the actual sport to measure the performance of the fantasy team; a selection of a number of series corresponding to an actual yearly schedule of the sport; and optionally a selection of a number of games in each series, wherein the processing system calculates fantasy scoring statistics based on the actual scoring statistic categories accrued by the fantasy team over the at least one series.

The present invention is additionally directed to a system for playing fantasy sports including a means for selecting a real-life sport, the sport having a multiple game schedule; a means for forming at least two fantasy teams, each team having at least one real-life player from the real-life sport; a means for selecting a plurality of scoring statistics based on real-life scoring statistics associated with the real-life sport to measure the performance of the fantasy team; a means for selecting a number of series corresponding to a real-life schedule of the sport; a means for selecting a number of games in each series; and a means for evaluating the fantasy scoring statistics accrued by the fantasy team over at least one series.

Furthermore, the present invention encompasses a method of playing fantasy sports that includes providing a fantasy sports league and receiving league formation registration from at least two fantasy teams, each team being associated with at least one actual player from an actual sport that is played over a multiple-game schedule. In a preferred embodiment, the method further includes receiving selection of a plurality of scoring statistics based on actual scoring statistics associated with the actual sport to measure the performance of the fantasy team, receiving selection of a series corresponding to a portion of an actual schedule of the sport, and receiving the scoring statistics accrued by the fantasy team during the course of the selected series, wherein the selected series comprises a number of games and the portion in all the selected series is less than the total games in the schedule of the actual sport over a season, processing the scoring statistics accrued, and transmitting results based on the statistics accrued. In some embodiments, the method of the present invention includes receiving a selection one or more games from the series in which a player will be activated and processing the selection of one or more games.

Any of the embodiments illustrated above and below stand independently or features may be combined to achieve preferred embodiments. Additional advantages and embodiments of the invention will also become more apparent to those of ordinary skill in the art upon review of the teachings of the present application.

BRIEF DESCRIPTION OF DRAWINGS

Further advantageous features of the present invention will become more apparent with the following detailed description when taken with reference to the accompanying drawings in which:

FIG. 4 illustrates multiple series of the system and methods of the present invention over portions of an 81 game season for the actual sport, in accordance with one embodiment of the present invention.

DETAILED DESCRIPTION OF THE PREFERRED EMBODIMENTS

Figure 1:
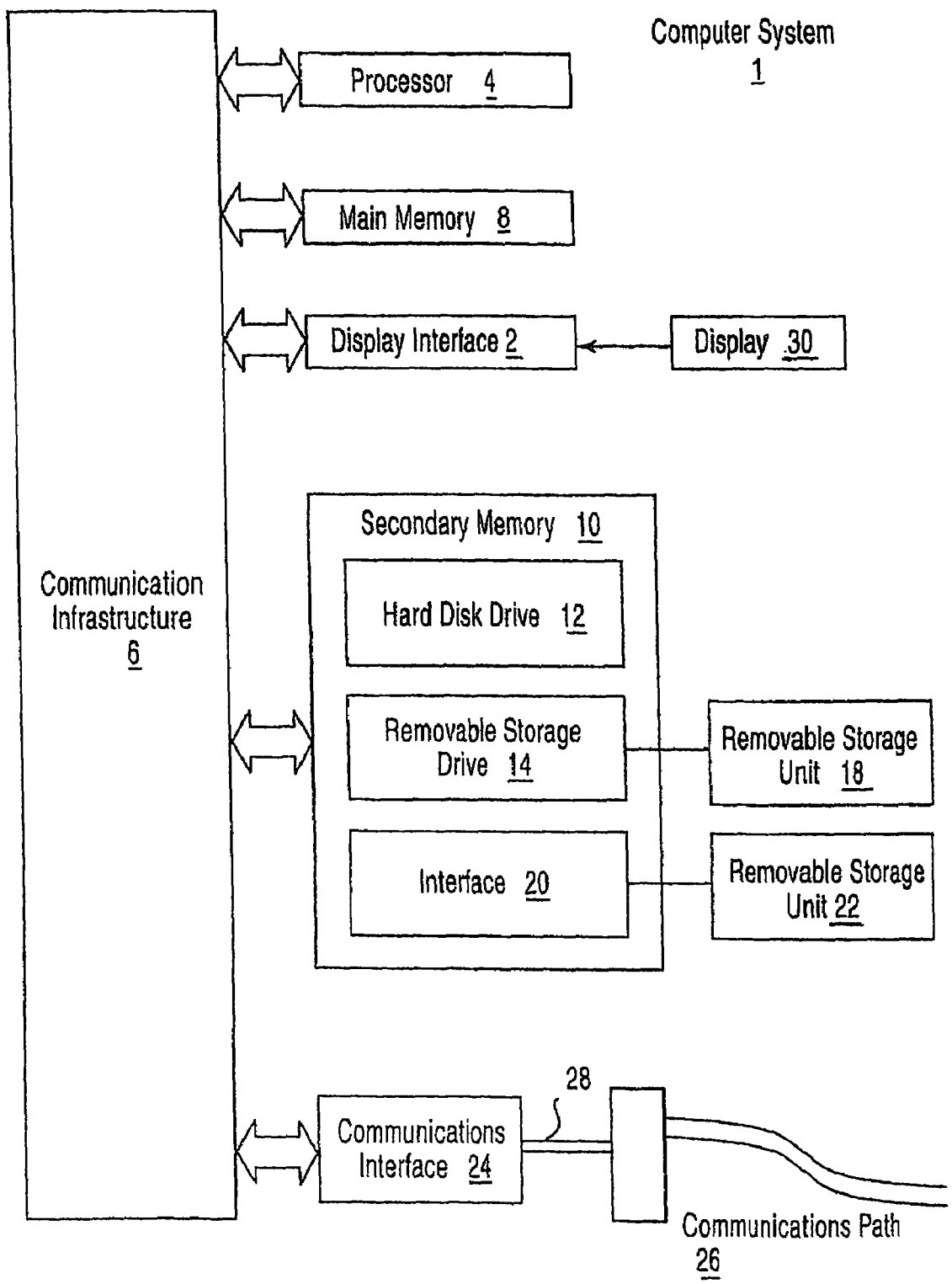
FIG. 1 illustrates a block diagram with various computer system components for use with an exemplary implementation of a fantasy sports league system, in accordance with one embodiment of the present invention.

The present invention is directed to a fantasy sports system and method of playing that allows the owner to participate directly against fellow fantasy owners while advantageously focusing the owner's attention to discrete time periods that are shorter than the regular season, thereby minimizing or avoiding the loss of interest typically associated with rotisserie format fantasy sports. In particular, one or more of the fantasy sports team owners preferably select a number of games for a fantasy series that is less than the total number of real games being played during a particular time frame, and preferably also select a number of series that includes less than the total number of real games played during the entire season of that sport. It should be understood that terms used herein, including "games" and "played" relates to all different types of sports, including, e.g., racing events, golf matches, etc.

Further, some embodiments of the present invention reduce or avoid the tedious hassle of watching or tracking a large number of games during the discrete time period, for example, because the fantasy team owners select only a limited number of games from the total number of games occurring during the discrete period during which their teams compete. The fewer the number of games used for fantasy play, for example, a series of only one or two games over the discrete period, creates a more focused experience for the fantasy team owners and, therefore, helps retain the fantasy team owners' interest overall excitement in these games and the fantasy play. Moreover, by using only a select number of games occurring in the discrete period, the fantasy team owners' game selections have heightened importance in the overall fantasy season. As a result, the fantasy team owners potentially become even more interested in the fantasy play, learning the specifics of a particular sport, and enjoy a better overall fantasy play experience.

The present invention includes a method and system for scheduling a fantasy sport season using a plurality of series, i.e., discrete head-to-head competitions between fantasy teams in a particular fantasy league, wherein the total number of real-life games among the series is fewer than the number of games in the season of the real-life sport. In some embodiments, the total number of real-life games among all of the series is less than the regular season of the real-life sport and the period of the real-life season which is required for the playoffs of the fantasy sport. The selection of series according to the present invention inherently increases the accuracy and realism of the head-to-head competitions based on the actual performance of players selected for each fantasy team.

Preferably, the present invention includes a computer or other suitable processing system with application software and a communication network, such as the Internet. The present invention, in one embodiment, provides a graphical user interface (GUI) for the entry of data, such as the players selected for each fantasy team, as well as the real-life games of each player corresponding to particular fantasy games. The GUI also presents information, such as in a graphical manner, to show the statistics of fantasy teams, the players on those teams, the statistics of the individual players on each fantasy team, and the standing of those fantasy teams relative to one another. The invention can also display the fantasy owners of each fantasy team in a particular fantasy league, the total number of fantasy teams per fantasy league, a competition schedule, and other information related to planning, organizing, running, managing, or participating in the fantasy sports league or fantasy sports team within the league.

For the purposes of this invention, a real-life sport may include any sport, professional or amateur, having multiple games or matches over a an annual or regular schedule. Typical sports include, for example, basketball, baseball, autoracing, soccer, football, hockey, golf, racing, tennis, rugby, cricket, or bowling. In some embodiments, sports from the following professional associations may be applicable: the National Basketball Association (NBA); Major League Baseball (MLB), the National Hockey League (NHL); the National Collegiate Athletic Association (NCAA), North American Stock Car Auto Racing (NASCAR); Professional Bowling Association (PBA); Professional Golf Association (PGA); International Tennis Federation (ITF), and their international and national sister organizations, for example. International sports leagues, such as nationally-based soccer leagues, e.g., the English Premier League, and auto-racing, such as Formula I and Grand Prix, are also applicable.

The formation of suitable fantasy leagues and teams is generally known in the art, and any available methods or systems available to those of ordinary skill in the art are contemplated for such purpose according to the invention. Typically, at least two fantasy teams are formed and fantasy players are selected or drafted to compromise a "fantasy roster." As used herein, a fantasy league may include 2 or more teams competing against one another.

The operation and function of the fantasy draft would generally be known to one of ordinary-skill in the art, and basically encompasses a method to select players on each fantasy team. In some embodiments, a commissioner is selected to govern the league and to select the series, i.e., interval, and the limited number and/or specific games of the series based on the schedule of the actual sport.

A fantasy season may be broken up into a plurality of series for head-to-head games or matches over the course of a fantasy season, which will last until the final selected game in the final selected series. Thus, the series is defined to encompass a discrete time period of the real-life season of the sport in interest. Each fantasy series includes one or more real-life games up to a number of games that is less than the total number of games in the selected series. The number of series in a fantasy season may be variable, and is typically more than two, preferably more than three, more preferably more than four, and even more preferably more than four series of head-to-head match ups. For example, in some variations the number of series is more than 1, more than 10, or more than 50. The number of series that may be played corresponds to the length of the season of the actual sport. Accordingly, it is within the scope of the present invention that from about 2 to about 80, preferably from about 20 to about 70, more preferably from about 30 to about 60, series may be played for a sport with a 162 game schedule. Moreover, for a sport with 81 games, for example, from about 2 to about 40, preferably from about 10 to about 35, and more preferably from about 20 to about 30, series are conceivable. In other embodiments of the present invention the number of series per season is less than or equal to 99%. In some variations, the number of series is less than or equal to 98%, less than or equal to 95%, less than or equal to 90%, or less than or equal to 80%. This percentage may be as low as 1% as long as the number of games in the series is no less than two.

In additional embodiments, the number of series per fantasy season is subject to the following: the number of real-life games covered by the total number of series selected for the fantasy season, provided that, a series always includes fewer than the total number of real-life games in the annual schedule of that fantasy sport. A head-to-head match between a first fantasy team and a second fantasy team preferably lasts one series, but may last over any number of series in the annual schedule.

In certain embodiments of the present invention, a plurality of series are selected. For example, in a 162-game schedule in MLB, 25 series consisting of 5 games may be played. The games of a series are preferably in consecutive order according to the real-life schedule, but may be any games on the real-life schedule.

A series includes one or more, preferably two or more, real-life games. In some variations, the number of games within a period varies from 1 to 14, preferably 3 to 12, more preferably from 4 to 10, and even more preferably from 5 to 8 games. The owner assigns each of the "starting" or selected players (players selected to accrue points in the series) to at least one game within the fantasy period. Generally, the rules of each fantasy league dictate the number of starting versus reserved players.

Preferably, fewer than all games in a series are included in play. Therefore, the league may prescribe the number of games each fantasy player must play in a given series that is less than the total number of games, e.g., two selected games out of a total number of three or more played over the timer period, e.g., a week or a biweekly. For example, if there are 5 games in the series, the league rules may say each fantasy player shall play in at least two real-life games. The number of games selected in a series can also be determined on a percentage basis, as a percentage of the total number of games. For example, play must include at least 40 percent, or at least 60 percent, of the games in a series but no more than a specified maximum that is less than the total number of games in the series. Alternatively, a specific percentage may be selected, i.e., exactly 50 percent, or 25 percent or 75 percent, of the games As used herein, the term "play in" implies that the fantasy player is a "starter" and can accrue points used towards the fantasy team's total score for the series. Each starting player's statistics from those games are combined to form the series information.

At the end of each fantasy series, the players' statistics for the starting roster, in some variations the whole roster, are totaled. Each fantasy team's statistics are determined by combining the previously totaled statistics of each player and comparing that fantasy team's total statistics against a challenging fantasy team's statistics (in head-to-head play). That is to say that the invention can be used in accordance with head-to-head format fantasy play. The fantasy team with the best statistics is declared the winner of that fantasy series. In some embodiments, the fantasy team that wins the most fantasy series wins the fantasy regular season. Alternatively, particular statistics are accorded a corresponding point value or ranking based on an otherwise normalized comparison, and the fantasy team with the highest or lowest number of points or rankings wins the fantasy series or game. Accordingly, rotisserie style play is also conceivable using the present invention. In variations of rotisserie play, the statistics for each series are cumulated at the end of the season (or some predefined period) and each team's statistics, i.e., every team in the league, is compared against one another.

Generally, the actual statistics from the real games participated in by each fantasy player are used in a play of the fantasy sport. As used herein, "statistics" encompasses any identifiable, measurable, monitored and/or recorded value accrued by a player in the player's actual sport. For example, Michael Jordan's statistics in basketball may include (but are not limited to) one or more of the number of shots taken, number of minutes played, and defensive rushes (if this statistic is kept and recorded). It would be understood to one of ordinary skill in the art that each sport includes preferred or commonly used statistics in that sport, which are the preferred statistics selected in the scoring systems used for that sport in the present invention. For example, for baseball, common statistics may include batting average, home runs, runs batter in (RBI), runs, hits, earned run average (ERA), walks plus hits per innings pitched (WHIP), strikeouts, wins, and saves.

Statistics are calculated, input, or provided by a database either manually or preferably automatically and/or electronically, i.e., by computer or similar processing device. Electronically includes, but is not limited to computer, Internet, or other suitable electronic processing. Automatic updating can occur at set time intervals, upon request by the fantasy league "commissioner" (the player or non-playing third party organizing the fantasy league), or upon request by the manager of a particular fantasy team. For example, if league rules allow 6 points for each touchdown and 1 point for each yard rushing, a fantasy player would accrue 8 points for having 1 touchdown and 50 yards rushing in a corresponding real-life game. In some variations of the present invention, statistics are received electronically via a statistics provider. The statistic provider may be independent or integrated with the system and methods of the present invention. In further variations, the statistics are received in real-time and/or the player updates are generated automatically or upon request.

In conventional head-to-head matches, teams compete over a regular interval of games, containing a week's worth of games, for example, and (starting) players' statistics are accrued from each and every game in the period. However, in many instances, some real-life players will play 7 games in the interval while others may play 5 or 6, for example. The present invention allows owners to avoid gaps in a real-life player's schedule by allowing owners to chose the games in which the players fantasy points will accrue towards the total fantasy team score, and the number of actual games where the player is active will match up with the number of actual games of every other player in that fantasy league participating in that series.

Changes in roster players for each fantasy team may also occur during a fantasy season, such as by replacement of players for non-performance, injury, or other reasons, including trade of roster players between fantasy team owners. Additionally, players may be reserved or "benched, or activated or "started," as specific league rules permit.

Preferably, the performance statistics of each activated player on the fantasy roster are only calculated for the game or games designated by the owner. For example, in one variation, in a 5 game series, the fantasy owner may designate the statistics of game 3 to represent player A's performance, while the owner may designate the statistics of game 1 to represent player B's performance. Multiple games may be designated in some variations. In other variations, the number of designated games in each series over the course of a fantasy season may be variable, e.g., one designated game per player in the first series and two designated games per player in the second series, and so on.

Each fantasy team owner can, in one embodiment, select only a single game for each player occurring during the discrete period. As a result, if a player on the fantasy team owner's fantasy team is injured early in the selected game, the only statistics the fantasy team owner gets for the player are the statistics that player has managed to amass prior to the time of injury. The fantasy team owner cannot rely on other games played by the player during that discrete period to make up for the low or non-existent statistics of the selected game. Therefore, selection of the games becomes much more important and potentially creates more intrigue, tends to foster more analysis by fantasy team owners, and can result in a better overall fantasy game experience. Moreover, the present invention allows owners to apply a greater breadth of knowledge of actual sports than conventional formats. In conventional head-to-head formats, owners decide whether to "activate" or "play" a particular player based on expected performance for the head-to-head period, which typically lasts over many games. Thus, a selected player would be activated for six to seven games in a weekly head-to-head professional baseball, e.g., MLB, fantasy sports league. Over the course of that period, i.e., six to seven, games, the player will typically perform to the level expected based the players past performances. Over the course of multiple periods, the player's performance will likely converge towards his expected performance. Thus, in these conventional leagues, it would be rudimentary to select fantasy players whose performance is expected to be high over the course of season. Numerous publications rank and predict players' overall performance of a season. Because these statistics are so readily available, owners with access to the publications can make quick and simple decisions, without even having any further knowledge of the game.

In one embodiment of the present invention, owners pick not only the player, but also specific games in which the player will be designated as "active" or "activated." As used herein, "active" generally means that the active player's accrued points in those games will be considered and tabulated towards the total fantasy team points, wherein a "bench" or "reserve" player's points are not totaled. For example, the owner can select the specific game or match up which would be expected to produce the best statistics for a given player. This selection process typically involves assessing numerous factors related to the real-life sport, and involves significantly more analysis than simply selecting the best player on the team.

As shown in FIG. 1, the present invention may be implemented using hardware, software, or a combination thereof, and may be implemented in one or more computer systems or other processing systems. In one embodiment, the invention is directed toward one or more computer systems capable of carrying out the functionality described herein.

FIG. 1 shows a computer system 1 that includes one or more processors, such as processor 4. The processor 4 is connected to a communication infrastructure 6 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1 can include a display interface 2 that forwards graphics, text, and other data from the communication infrastructure 6 (or from a frame buffer not shown) for display on the display unit 30. Computer system 1 also includes a main memory 8, preferably random access memory (RAM), and may also include a secondary memory 10. The secondary memory 10 may include, for example, a hard disk drive 12 and/or a removable storage drive 14, representing a floppy disk drive, a magnetic tape drive, an optical disk drive, etc. The removable storage drive 14 reads from and/or writes to a removable storage unit 18 in a well known manner. Removable storage unit 18, represents a floppy disk, magnetic tape, optical disk, etc., which is read by and written to removable storage drive 14. As will be appreciated, the removable storage unit 18 includes a computer usable storage medium having stored therein computer software and/or data.

In alternative embodiments, secondary memory 10 may include other similar devices for allowing computer programs or other instructions to be loaded into computer system 1. Such devices may include, for example, a removable storage unit 22 and an interface 20. Examples of such may include a program cartridge and cartridge interface (such as that found in video game devices), a removable memory chip (such as an erasable programmable read only memory (EPROM), or programmable read only memory (PROM)) and associated socket, and other removable storage units 22 and interfaces 20, which allow software and data to be transferred from the removable storage unit 22 to computer system 1.

Computer system 1 may also include a communications interface 24. Communications interface 24 allows software and data to be transferred between computer system 1 and external devices. Examples of communications interface 24 may include a modem, a network interface (such as an Ethernet card), a communications port, a Personal Computer Memory Card International Association (PCMCIA) slot and card, etc. Software and data transferred via communications interface 24 are in the form of signals 28, which may be electronic, electromagnetic, optical or other signals capable of being received by communications interface 24. These signals 28 are provided to communications interface 24 via a communications path (e.g., channel) 26. This path 26 carries signals 28 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 14, a hard disk installed in hard disk drive 12, and signals 28. These computer program products provide software to the computer system 1. The invention is directed to such computer program products.

Computer programs (also referred to as computer control logic) are stored in main memory 8 and/or secondary memory 10. Computer programs may also be received via communications interface 24. Such computer programs, when executed, enable the computer system 1 to perform the features of the present invention, as discussed herein. In particular, the computer programs, when executed, enable the processor 4 to perform the features of the present invention. Accordingly, such computer programs represent controllers of the computer system 1.

In an embodiment where the invention is implemented using software, the software may be stored in a computer program product and loaded into computer system 1 using removable storage drive 14, hard drive 12, or communications interface 24. The control logic (software), when executed by the processor 4, causes the processor 4 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 2:
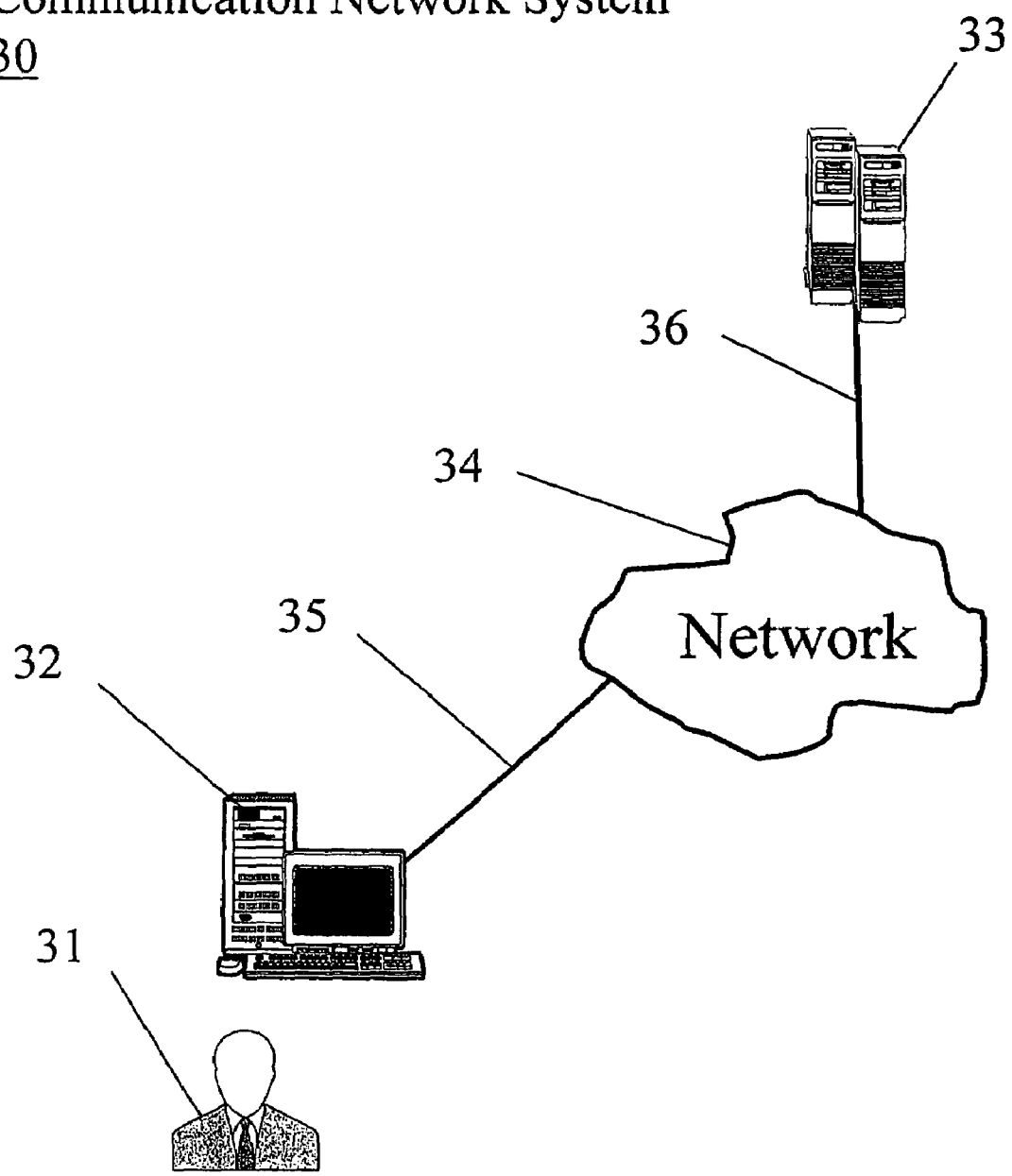
FIG. 2 shows a communication system 30 of the present invention for use with the computer system of FIG. 1, in accordance with one embodiment of the present invention.

As shown in FIG. 2, the communication system 30 includes an accessor 31 (also referred to interchangeably herein as a "user") and a terminal 32. In one embodiment, data for use in the computer system 1 is, for example, input and/or accessed by the accessor 31 via the terminal 32, such as a personal computer (PC), minicomputer, mainframe computer, microcomputer, telephonic device, or wireless device, such as a hand-held wireless device coupled to a server 33, such as a PC, minicomputer, mainframe computer, microcomputer, or other device having a processor and a repository for data and/or connection to a processor and/or repository for data, via, for example, a network 34, such as the Internet or an intranet, and couplings 35, 36. The couplings 35, 36 include, for example, wired, wireless, or fiberoptic links. In another embodiment, the method and system of the present invention operate in a stand-alone environment, such as on a single terminal. For all data received or transmitted under the present invention, such as player statistics and team scores, may be calculated based on values input, which may be manually input or downloaded from a database at any location, preferably remote. The database itself can be online, stored in fixed memory, or disk-based.

Figure 3:
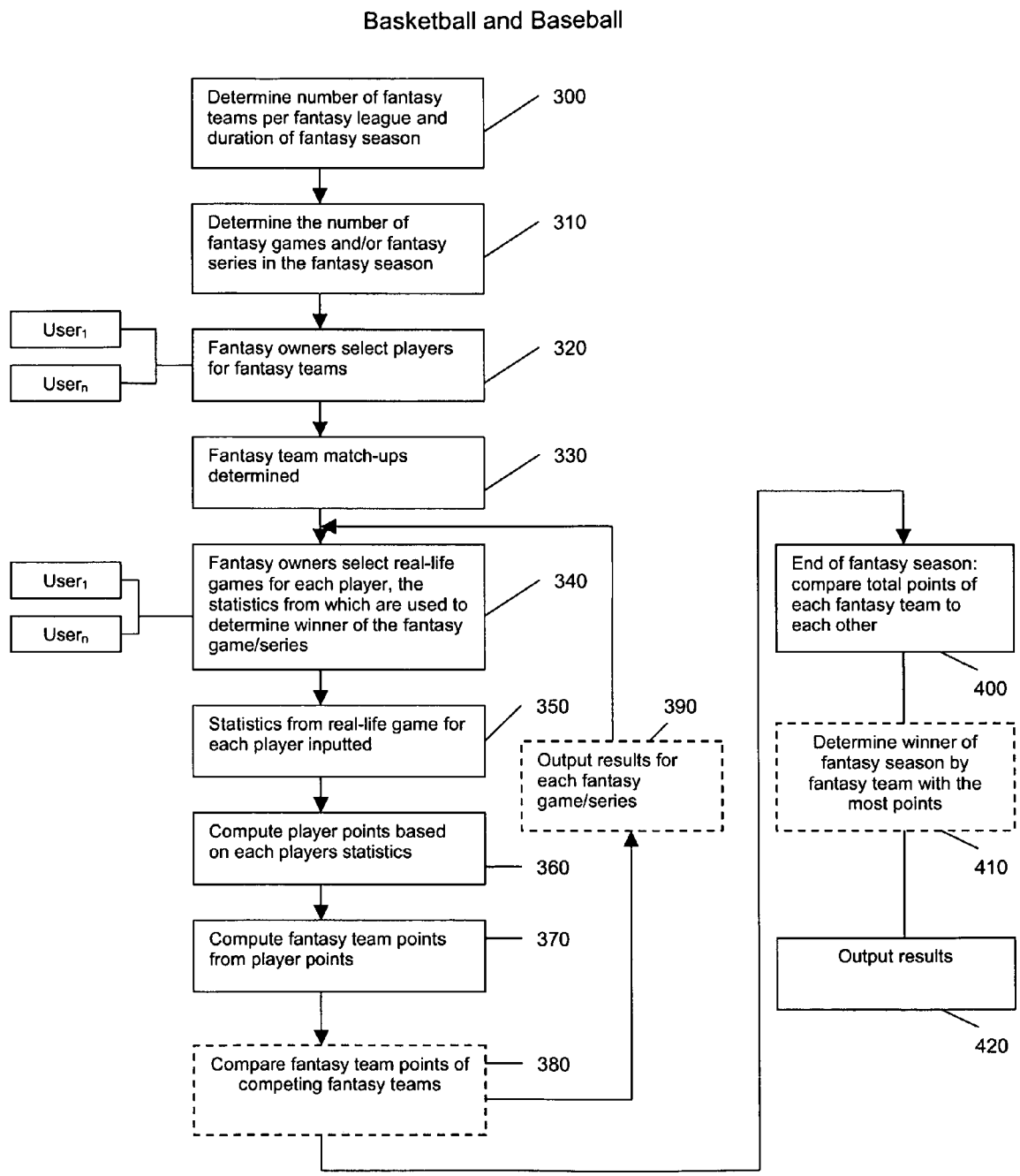
FIG. 3 illustrates the method and steps of one embodiment of the present invention, in accordance with one embodiment of the present invention.

For a particular sport, such as baseball or basketball, any number of fantasy leagues can be created. Each fantasy league includes one or more fantasy teams. Each team includes at least one player. As shown in FIG. 3, at step 300, a first set of input data is received. For example, the first set of data inputted can include the size of each fantasy league, i.e., how many fantasy teams include the fantasy league and the duration of a fantasy sport season. At step 310, a second set of input data is received. The second set of input data includes the number of fantasy games or fantasy series in the fantasy sport season. A fantasy series includes at least one fantasy game. In varying embodiments, the number of games selected in each fantasy series may be variable from series to series, e.g., 5 games of the actual sport in series 1, 6 games of the actual sport in series 3, and 4 games of the actual sport in series 5. See FIG. 4. The fantasy team that wins the most fantasy games in a fantasy series wins the fantasy series, for example. Additionally, each fantasy game or fantasy series spans a particular portion of the real-life season of the sport at issue. The commissioner of each fantasy league can define the scope of the first and second set of data inputted at Steps 300 and 310.

At step 320 a third set of data is received. The third set of data is inputted by each user, i.e., fantasy team owner, and includes the players for each fantasy team owner's fantasy team. The players can be selected, for example, using a draft system, a lottery system, or an auto draft system. In the draft system, the fantasy team owners are placed in a numerical order. The fantasy team owners select players in that numerical order. For example, the fantasy team owner first in the order selects the first player, the fantasy team owner second in the order selects the second player and so on. In the lottery system, each fantasy team owner is allotted a particular amount of credits, and each player is given a particular value in credits. The fantasy team owners fill their teams by exchanging credits for the players. It is also within the scope of the invention to select players by other methods, such as randomly, and optionally to include additional players on each fantasy team beyond a minimum number required to play the sport in interest to allow the fantasy team owner to substitute players into and out of the various positions of the sport. In the auto draft system, players are assigned to each fantasy team based on a predetermined value.

In some sports, such as professional soccer, there may be an insufficient number of players in a single real-life league to form a fantasy league having a sufficient number of fantasy teams and/or players scoring sufficiently to make the fantasy play interesting. Accordingly, it is within the scope of the invention to combine several professional sports leagues of a particular sport to create a sufficiently large pool of players. For example, in professional soccer, the players of the English Premier League, the German Premier League, and the French Premier League may be combined to form a sufficiently large pool from which the fantasy team owners select scoring players.

Once the first, second, and third sets of data are entered and received into the system, at Step 330 a fantasy season play schedule is created, wherein competing fantasy teams are matched up for each fantasy game or fantasy series of the entire fantasy season. For example, twenty series consisting of five games each may be selected over the course of a MLB schedule. The start and end dates of each series are noted. This information is stored in a storage medium and can be recalled at will by the commissioner or any of the fantasy team owners.

At Step 340 a fourth set of data is received. Prior to each fantasy head-to-head game or fantasy series, fantasy team owners select, from among their respective players, who will compete in each fantasy game or fantasy series. This selection process of "starters" and "reserves" is generally known in the art. Additionally, each fantasy team owner selects one or more real-life games for each player, preferably each starting player, occurring within a time interval over which the fantasy game or fantasy series spans (e.g., during the series lasting 7 days, the fantasy team owner selects two games for each player for which statistics will be used—the starters—in the fantasy play). The statistics from the selected real-life game or games are used to determine which fantasy team wins each fantasy game or fantasy series.

At Step 350 a fifth set of data is received. The fifth set of data includes the performance statistics for each player generated during the real-life game or games. Optionally, at Step 360 the individual player's statistics are converted into a point value. At Step 370 the total point value of each fantasy team is computed manually or automatically by adding the total points of the individual players on each fantasy team.

At Step 380 the total points or totaled statistics of the fantasy teams of a fantasy league are compared to determine winning and losing fantasy teams. For each comparison, the fantasy team with the best statistics or the most points wins. Alternately, the team having the fewest number of points wins, where, for example, the fewest points corresponds to a better performing team, such as in the sport of golf. Once the winning and losing teams for each fantasy game or fantasy series are determined, at Step 390 the results for each team are displayed and stored. Steps 340 through 390 are then repeated for each fantasy game or fantasy series occurring during the fantasy season. When the fantasy season concludes, in Step 400 the total statistics or the total points of each fantasy team for the fantasy season are tallied or determined. At Step 410, the combined statistics or the total points of each team are compared to the combined statistics or the total points of each of the other fantasy teams to determine an overall fantasy season winner or regular season winner, for example. At Step 420, the results of Step 410 are output and the results stored to a storage medium.

As shown in FIG. 4, an exemplary 81 game season of an actual sport may be adapted to 10 fantasy series, in accordance with one embodiment of the present invention. In this example, the series are of variable length, ranging from 4 to 6 games of the actual sport. Six players, included of two guard positions, one center position, two forward positions, and 1 utility position (any player of the previously listed positions), may be designated as starters per series. Players may be designated as "starters" for only one game per series in this example. Series 1 illustrates at least one player designated as starting for each game in the series, while series two indicates that only 3 games of the series include starters for Fantasy Team I. Thus, in series two, the players performance in games 14 and 17 will not be considered in the total score of the Fantasy Team I series 2. More specifically, as an example, on the statistics accrued by Shaquille O'Neal in game 15 will be totaled in the fantasy score for Fantasy team I in series 2.

EXAMPLES

The invention is further defined by reference to the following illustrative examples that may be used to prepare or administer the compositions of the present invention. These examples are for illustrative purposes only, and are not to be construed as limiting the appended claims.

Example 1

An Exemplary System for Fantasy Sport Play

Fantasy Team Owners select Fantasy Players, which are actual professional and/or amateur athletes to constitute their Fantasy Team. To play the game, "Fantasy Team Owners" face off against one another in scheduled contests in which "Fantasy Teams" compete one against another; just as in professional and/or amateur sports leagues. The outcome of these scheduled "Fantasy Games" rely on the statistics of "Fantasy Players" in real professional and/or amateur sports games.

The Commissioner/Provider (i.e., the host providing the fantasy games or the team owner(s) designated as administrator(s) of the league) defines the time-period and frequency for "Fantasy Games" in a given Fantasy Season." During that time-period, a professional and/or amateur player's statistical data represents one "Fantasy Players" score. If more than one professional and/or amateur game occurs during a given "Fantasy Game Night" for a given Fantasy Player, the Fantasy Team Owner determines which game his player's statistics will count toward his "Fantasy Teams" overall score. Thus, the Owner has the ability to choose the night the Owner's "Fantasy Player" plays during a fantasy game period.

During the time-period defined for one given Fantasy Game, a "Fantasy Player" may compete in 0, 1 or more than one professional and/or amateur games. The Fantasy Team Owner determines which of these professional and/or amateur games, and respective "Fantasy Player's" statistics generated, that will count toward their respective "Fantasy Team's" overall score.

The Provider/Commissioner predetermines how many professional and/or amateur game's results constitute a Fantasy Player's score. The Provider/Commissioner configures the "Fantasy League" to use one (and only one) game's results during the course of a "Fantasy Game-Night" as the basis for each "Fantasy Player's" score. Fantasy Game #1 is defined to be played during the week of January $1^{st}$ through January $7^{th}$. For "Fantasy Game" #1, Fantasy Team #1 will compete against Fantasy Team #2. The "Fantasy Players" on either team may compete in 0, 1 or many actual professional and/or amateur games during the week of January $1^{st}$ through January $7^{th}$. Prior to any of the professional and/or amateur games being played, the Fantasy Team Owners choose which professional and/or amateur games their respective player's statistics will count toward the team's overall score for "Fantasy Game" #1.

By using this format, wherein the professional or amateur player must perform on one particular night, a closer relationship is developed between the "Fantasy Team Owner," and the owner's corresponding Fantasy Players, and the owner's Fantasy Opponents' players. Moreover, a greater emphasis is placed on the "Fantasy Team Owners" coaching ability because the owner must select the night that his "Fantasy Players" stats will be used, against his "Fantasy Opponent.

This "schedule based approach" encourages owners to know more about player statistics, including how well players play against specific teams or other players. For example, the owner may choose to start Tim Duncan when he plays against a team with a weak center as opposed to starting him when he plays against Shaquille O'Neil, widely recognized as a more dominant center in the NBA.

The fantasy league is played through many different mediums, such as television, the internet, wireless and/or any other technological and/or non-technological means to give the owners constant exposure.

Example 2a

An Exemplary Embodiment for a Fantasy Baseball League, Such as One Based on MLB

Baseball fantasy leagues are determined at the beginning of the season by the commissioner of each respective league. The player pool is preferably selected from Major League Baseball for easy of obtaining statistical data and overall familiarity with the player personnel in the US at the professional level. However, the pool could also conceivably include players from other leagues, such as the minor leagues, the Japanese League, other foreign leagues, and any other leagues for which stats can be calculated. A fantasy series can be played over four to seven day span; or over three day span; or over a two day span. This allows you to schedule 2 fantasy series a weeks using the three day format; or 3 fantasy series a week using the two day format or 1 fantasy series a week using the 4-7 day format. The commissioner of each respective league, preferably with input from other fantasy owners in the league, determines how many series are played during their fantasy season. The fantasy owner uses his players stats for one night in his daily head to head competition with his fantasy opponent over an extend fantasy series (2, 3, or 4-7).

| Positions | Players | Stat | Points |
|---|---|---|---|
| | | Team #1 - FRIDAY | |
| C | V. Martinez | 2-4, 2 singles, 1R, 1RBI, 1BB | 5 |
| 1 | Helton | 4-4, 2 singles, 2 doubles, 3 RBI | 9 |
| 2 | Boone | 0-4, 1R, 1BB, 1SB | 3 |
| SS | Garciaparra | 3-4, 3 single, 1 SB | 4 |
| 3 | Blalock | 3-5, 2 doubles, 1HR, 2R, 3RBI | 13 |
| OF | Alou | 1-3, 1HR, 1R, 1RBI | 6 |
| OF | A. Jones | 0-5 | 0 |
| OF | S. Stewart | 2-4, 1 single, 1 double, 2R, 1SB | 6 |
| DH | Ramirez | 3-5, 3 singles, 1R, 2RBI | 6 |
| SP | Mulder | 8 IP, 2 ER, 6 K, W | 13.5 |
| RP | Rivera | 1.0 INN, 1S, 2K | 3.5 |
| | | TOTAL | 69 |
| | | SATURDAY | |
| C | V. Martinez | 2-4, 2 singles, 1R, 1RBI, 1BB | 5 |
| 1 | Helton | 4-4, 2 singles, 2 doubles, 3 RBI | 9 |
| 2 | Figgins | 0-4, 1R, 1BB, 1SB | 3 |
| SS | Garciaparra | 1-4, 1 single, 1 SB | 2 |
| 3 | Blalock | 3-5, 2 doubles, 1HR, 2R, 3RBI | 13 |
| OF | Alou | 1-3, 1HR, 1R, 1RBI | 6 |
| OF | A. Jones | 1-5, 1HR, 1RBI | 5 |
| OF | S. Stewart | 2-4, 1 single, 1 double, 2R, 1SB | 6 |
| DH | Ramirez | 3-5, 3 singles, 1R, 2RBI | 6 |
| SP | Prior | 8 IP, 2 ER, 6 K, W | 13.5 |
| RP | Rivera | 1.0 INN, 1S, 2K | 3.5 |
| | | TOTAL | 72 |
| | | SUNDAY | |
| C | V. Martinez | 2-4, 2 singles, 1R, 1RBI, 1BB | 5 |
| 1 | Helton | 4-4, 2 singles, 2 doubles, 3 RBI | 9 |
| 2 | Figgins | 0-4, 1R, 1BB, 1SB | 3 |
| SS | Garciaparra | 1-4, 1 single, 1 SB | 2 |
| 3 | Wright | 3-5, 2 doubles, 1HR, 2R, 3RBI | 13 |
| OF | Alou | 1-3, 1HR, 1R, 1RBI | 6 |
| OF | A. Jones | 0-5 | 0 |
| OF | S. Stewart | 2-4, 1 single, 1 double, 2R, 1SB | 6 |
| DH | Ramirez | 3-5, 3 singles, 1R, 2RBI | 6 |
| SP | Wright | 8 IP, 2 ER, 6 K, W | 13.5 |
| RP | Mota | 1.0 INN, 1S, 2K | 3.5 |
| | | TOTAL | 67 |
| | | Team # 2 - FRIDAY | |
| C | Posada | 2-4, 2 singles, 3R, 1RBI, 1BB | 7 |
| 1 | Pujols | 4-4, 2 singles, 2 doubles, 3 RBI | 9 |
| 2 | Soriano | 0-4, 1R, 1BB, 1SB | 3 |
| SS | Jeter | 3-4, 1 single, 1 SB | 4 |
| 3 | Rodriguez | 3-5, 2 doubles, 1HR, 2R, 3RBI | 13 |
| OF | Suzuki | 1-3, 1HR, 1R, 1RBI | 6 |
| OF | Sosa | 1-5, 1R | 1 |
| OF | Edmonds | 3-4, 1 single, 1 double, 2R, 1SB | 6 |
| DH | Griffey | 3-5, 3 singles, 1R, 2RBI | 6 |
| SP | Johnson | 8 IP, 2 ER, 6 K, W | 13.5 |
| RP | Baez | 1.0 INN, 1S, 2K | 3.5 |
| | | TOTAL | 72 |
| | | SATURDAY | |
| C | Posada | 0-5 | 0 |
| 1 | Giambi | 4-4, 2 singles, 2 doubles, 3 RBI | 9 |
| 2 | Soriano | 0-4, 1R, 1BB, 1SB | 3 |
| SS | Jeter | 1-4, 1 single, 1 SB | 2 |
| 3 | Rodriguez | 3-5, 2 doubles, 1HR, 2R, 3RBI | 13 |
| OF | Suzuki | 1-3, 1HR, 1R, 1RBI | 6 |
| OF | Sosa | 0-5 | 0 |
| OF | Edmonds | 2-4, 1 single, 1 double, 2R, 1SB | 6 |
| DH | Griffey | 3-5, 3 singles, 1R, 2RBI | 6 |
| SP | Johnson | 8 IP, 2 ER, 6 K, W | 13.5 |
| RP | Baez | 1.0 INN, 1S, 2K | 3.5 |
| | | TOTAL | 62 |

-continued

| Positions | Players | Stat | Points |
|---|---|---|---|
| | | SUNDAY | |
| C | Posada | 2-4, 2 HR, 3 RBI, 1BB | 12 |
| 1 | Pujols | 4-4, 2 singles, 2 doubles, 3 RBI | 9 |
| 2 | Soriano | 0-4, 1R, 1BB, 1SB | 3 |
| SS | Jeter | 1-4, 1 single, 1 SB | 2 |
| 3 | Rodriguez | 3-5, 2 doubles, 1HR, 2R, 3RBI | 13 |
| OF | Suzuki | 1-3, 1HR, 1R, 1RBI | 6 |
| OF | Dunn | 0-5 | 0 |
| OF | Edmonds | 2-4, 1 single, 1 double, 2R, 1SB | 6 |
| DH | Sosa | 3-5, 3 singles, 1R, 2RBI | 6 |
| SP | Johnson | 8 IP, 2 ER, 6 K, W | 13.5 |
| RP | Baez | 1.0 INN, 1S, 2K | 3.5 |
| | | TOTAL | 74 |

| GAMES | | | |
|---|---|---|---|
| | FRI | SAT | SUN |
| TEAM #1 | 69 | 72 | 67 |
| TEAM #2 | 72 | 67 | 74 |

| STANDINGS | | |
|---|---|---|
| | RECORD (W-L) | TOTAL POINTS |
| TEAM #1 | 2-1 | 208 |
| TEAM #2 | 1-2 | 213 |

Example 2b

Another Exemplary Embodiment for a Fantasy Baseball League, Such as One Based on MLB Baseball fantasy leagues are determined at the beginning of the season by the commissioner of each respective league. A fantasy game can be played over four to seven day span or over three day span or over a two day span. This allows you to schedule 2 fantasy games a weeks using the three day format or 3 fantasy games a week on the two day format or 1 fantasy game a week using the 4-7 day format. The commissioner of each respective league determines how many games are played during their fantasy season. The fantasy owner gets to pick one night that his respective player stats will be used in his head to head competition with his fantasy opponent over an extended fantasy game night (2, 3, or 4-7).

| Positions | Players | Fri. | Sat. | Stat | Points |
|---|---|---|---|---|---|
| | | Team #1 | | | |
| C | V. Martinez | X | | 2-4, 2 singles, 1 R, 1 RBI, 1 BB | 5 |
| 1 | Helton | | X | 4-4, 2 singles, 2 doubles, 3RBI | 9 |
| 2 | Figgins | | X | 0-4, 1R, 1BB, 1SB | 3 |
| SS | Garciaparra | X | | 1-4, 1 single, 1SB | 2 |
| 3 | Blalock | X | | 3-5, 2 doubles, 1HR, 2R, 3RBI | 13 |
| OF | Alou | X | | 1-3, 1HR, 1R, 1RBI | 6 |
| OF | A. Jones | | X | 0-5 | 0 |
| OF | S. Stewart | | X | 2-4, 1 single, 1 double, 2R, 1SB | 6 |

-continued

| Positions | Players | Fri. | Sat. | Stat | Points |
|---|---|---|---|---|---|
| DH | Ramirez | | X | 3-5, 3 singles, 1R, 2RBI | 6 |
| SP | Mulder | X | | 8 IP, 2ER, 6K, W | 13.5 |
| RP | Rivera | X | | 1.0 INN, 1S, 2K | 3.5 |
| | | | | TOTAL | 67 |

Team #2

| | | | | | |
|---|---|---|---|---|---|
| C | Posada | | X | 0-5 | 0 |
| 1 | Pujols | | X | 4-4, 2 singles, 2 doubles, 3RBI | 9 |
| 2 | Soriano | | X | 0-4, 1R, 1BB, 1SB | 3 |
| SS | Jeter | | X | 1-4, 1 single, 1 SB | 2 |
| 3 | Rodriguez | | X | 3-5, 2 doubles, 1HR, 2R, 3RBI | 13 |
| OF | Suzuki | | X | 1-3, 1HR, 1R, 1RBI | 6 |
| OF | Dunn | | X | 0-5 | 0 |
| OF | Edmonds | | X | 2-4, 1 single, 1 double, 2R, 1SB | 6 |
| DH | Sosa | | X | 3-5, 3 singles, 1R, 2RBI | 6 |
| SP | Johnson | X | | 8 IP, 2ER, 6K, W | 13.5 |
| RP | Baez | X | | 1.0 INN, 1S, 2K | 3.5 |
| | | | | TOTAL | 62 |

SCOREBOARD

| | FINAL SCORE |
|---|---|
| TEAM #1 | 67 |
| TEAM #2 | 62 |

STANDINGS

| | RECORD (W-L) | TOTAL POINTS |
|---|---|---|
| TEAM #1 | 1-0 | 67 |
| TEAM #2 | 0-1 | 62 |

With respect to head to head competition, the 11 players who are started by each Fantasy Owner for each game have their statistics added. The fantasy owner with the most points gets the victory. The record determines the seeding for each Fantasy Owner for the playoffs. Total Points are used as the first tie breaker in determining fantasy teams rankings within any given league. The head to head record is used as the last tie breaker in determining overall standings.

All these guidelines are established by each individual commissioner and/or provider.

Among the values for which points may be determined are as follows:

| #PIPA | Pitches seen per plate appearance |
|---|---|
| 2B | Doubles |
| 3B | Triples |
| AB | At-bats |
| Avg | Batting average (H divided by AB) |
| BB | Bases on balls |
| BB/K | Walks Per Strikeout |
| BB/PA | Walks Per Plate Appearance |
| CS | Caught stealing |
| FB | Fly balls hit, excluding home runs |
| G | Games played |
| G/F | Ground ball/fly ball ratio (GB divided by FB) |

-continued

| #PIPA | Pitches seen per plate appearance |
|---|---|
| GIDP | Grounded into double play |
| H | Hits |
| HBP | Hit by pitch |
| HR | Home runs |
| IBB | Intentional bases on balls |
| IsoP | Isolated Power (Slugging Percentage - Batting Average) |
| LOB | Runners left on base |
| OBP | On-base percentage (H + BB + HBP) divided by (AB + BB + HBP + SF) |
| OPS | On-base percentage plus slugging percentage. See OBP, above, and Slg, below, for definitions |
| OW % | Offensive winning percentage. The theoretical winning percentage of a team comprising nine of the same players (e.g., nine Ken Griffey Jr.). 1) Figure runs created per 27 outs [Note: Total outs = (AB − H + C + GIDP + SH + SF)]. 2) Divide by league average runs per game. 3) Square the result. 4) Divide that figure by 1 + itself Qualified year-to-date In order to qualify for batting titles in averaged categories (Avg, Slg, OBP, OPS, RC, OW %, #P/P A, G/F), a player must average at least 3.1 plate appearances for every game his team has played. Sorting by qualified year-to-date excludes all players not currently on pace to reach that minimum |
| R | Runs |
| RBI | Runs batted in |
| RC | Runs created [(H + BB + HBP − CS − GIDP) times (Total bases + .26[BB − IBB + HBP] + .52[SH + SF + SB])] divided by (AB + BB + HBP + SH + SF) |
| RC27 | Runs created per 27 outs (Estimates how many runs per game a team made up of nine of the same player would score) |
| SB | Stolen bases |
| SecA | Secondary Average (A way to look at a player's extra bases gained, independent of Batting Average) (TB − H + BB + SB − CS)/AB |
| SF | Sacrifice flies |
| SH | Sacrifice hits |
| Slg | Slugging percentage TB divided by AB |
| SO | Strikeouts |
| TB | Total bases [Hits + (2B times 2) + (3B times 3) + (HR times 4)] |
| TPA | Total plate appearances (AB + BB + HBP + SF + SH + times reached on defensive interference) |
| XBH | Extra Base Hits (2B + 3B + HR) |

| PITCHING STATISTICS: | |
|---|---|
| #P/IP | Pitches thrown per inning |
| #P/GS | Pitches thrown per start |
| #Pit | Pitches thrown |
| 2B | Doubles allowed |
| 3B | Triples allowed |
| AGS | Average Game Score. See Game Score, below |
| Avg | Batting average allowed |
| BB | Bases on balls |
| BIPA | Balls In Play Average. Batting Average Against, not including home runs or strikeouts. |
| Bk | Balks |
| BlSv | Blown saves. See SvOp, below, for definition of a save situation |
| CG | Complete games |
| CS | Runners caught stealing |
| CW | Cheap Wins. Wins in games started that are not Quality Starts. |
| Dec | Decision (Win, loss) |
| DIPS ERA | A pitcher's ERA, independent of the defense behind him. This formula, based on essays by Voras McCracken, assumes that all pitchers have consistent BIPA (See Above), and adjusts accordingly. The DIPS ratios on ESPN use the DIPS 2.0 formula, are not park-adjusted, and do not adjust for knuckleball pitchers. |

PITCHING STATISTICS:

| | |
|---|---|
| ER | Earned runs |
| ERA | Earned-run average (ER times 9 divided by IP) |
| ERC | Component ERA. A pitcher's ERA based on the hits and walks the pitcher allowed, rather than actual runs. |
| ERC % | Ratio of Component ERA to actual ERA |
| FB | Fly balls hit against |
| G/F | Ground ball/fly ball ratio against (GB divided by FB) |
| GB | Ground balls hit against |
| GIDP | Grounded into double plays against |
| GF | Games finished |
| GS | Games started |
| GSc | Game Score. Start with 50 points. Add 1 point for each out recorded, (3 points per inning). Add 2 points for each inning completed after the 4th. Add 1 point for each strikeout. Subtract 2 points for each hit allowed. Subtract 4 points for each earned run allowed. Subtract 2 points for each unearned run allowed. Subtract 1 point for each walk. |
| H | Hits against |
| Hld | Holds. Earned when a relief pitcher enters a game in a save situation (see SvOp, below, for definition), records at least one out, and leaves the game without having given up the lead |
| HR | Home runs allowed |
| IBB | Intentional bases on balls |
| IP | Innings pitched |
| IR | Inherited runners. Runners on base when a relief pitcher enters a game |
| L | Losses |
| OBP | On-base percentage allowed. See OBP in Batting Statistics, above, for definition of OBP |
| ORuns | Opponents' runs scored (average, per nine innings pitched) while the pitcher of record. |
| PFR | Power/Finesse Ratio (Strikeouts Plus Walks Divided By Innings Pitched). Qualified year-to-date In order to qualify for pitching titles in averaged categories (ERA, WPct, #P/IP, RS, ORuns, Slg, OBP, Avg, CS %, G/F), a player must average at least one inning pitched for every game his team has played. Sorting by qualified year-to-date excludes all players not currently on pace to reach that minimum |
| QS | Quality starts |
| R | Runs |
| RBI | Runs batted in allowed |
| Rel | Relief decision (Save, blown save, hold) |
| RS | Run support. Team's runs scored (average, per 9 innings pitched) while the pitcher of record |
| SB | Stolen bases allowed |
| SF | Sacrifice flies allowed |
| SH | Sacrifice hits allowed |
| ShO | Shutouts |
| Slg | Slugging percentage allowed. See Slg in Batting Statistics, above, for definition |
| SO | Strikeouts |
| Sv | Saves. Earned when a pitcher finishes a game without having given up the lead after entering in a save situation (see SvOp, below, for definition) |
| SvOp | Save opportunities. When a pitcher 1) enters the game with a lead of three or fewer runs and pitches at least one inning, 2) enters the game with the potential tying run on base, at bat, or on deck, or 3) pitches three or more innings with a lead and is credited with a save by the official scorer |
| TBF | Total batters faced |
| TL | Tough Losses. Losses in games started that are Quality Starts. |
| WHIP | Walks plus hits divided by Innings Pitched |
| W | Wins |
| WPct | Winning percentage Wins divided by (Wins + losses) |
| WP | Wild pitches |

FIELDING STATISTICS

| | |
|---|---|
| A | Assists |
| CERA | Catcher's earned-run average. Earned-run average of club's pitchers with a particular catcher behind the plate |
| CS | Runners caught stealing |
| CS % | Percentage of runners caught stealing |
| DP | Double plays |
| E | Errors |
| FPct | Fielding percentage (PO + A) divided by (PO + A + E) |
| G | Games played |
| GS | Games started |
| Inn | Innings |
| PB | Passed balls |
| PCS | Pitchers' caught stealing. Total runners caught stealing when the player who initiates the fielding play is the pitcher |
| PO | Putouts |
| POA | Pickoff attempts. Qualified year-to-date In order to qualify for fielding titles in averaged categories (FPct., RF, CS %, CERA), a player must meet the following qualifiers: Catchers must play ½ of their team's games; Pitchers must average at least one inning pitched for each of their team's games; Position players must play ⅔ of their team's games. Sorting by qualified year-to-date excludes all players not currently on pace to reach that minimum |
| RF | Range factor (PO + A) divided by 9 innings |
| SBA | Stolen bases allowed |
| TC | Total chances |
| ZR | Zone rating. The percentage of balls fielded by a player in his typical defensive "zone," as measured by STATS, Inc. |

Bonus statistics may include, but are limited to, a no-hitter, a perfect game, or hitting for the cycle.

Exemplary offensive points include, but are not limited to, singles, steals, runs, bases on balls, and runs batted in (1 point each), doubles (2 points), triples (3 points), home runs (4 points), and a 10-point bonus for hitting for the cycle.

Exemplary pitching points include, but are not limited to, strikeouts (one-quarter point; a pitcher with 10 strikeouts should be rewarded the same points as a win), innings pitched (1 point per inning), quality starts and saves (2 points each), wins (5 points each), plus bonuses for a no-hitter (10 points) or a perfect game (20 points). Exemplary deductions of pitching points include, but are not limited to, one-half point for each earned run yielded, 2 points for a blown save, and 5 points for a loss.

Drafts can be conducted based on an actual draft format or an auction based format. In one draft format, a commissioner and/or provider decides the draft order before draft day. Fantasy owner drafts his players based on position in his respective draft by what ever order any individual league adapts. The total amount of players drafted is determined by the commissioner and/or provider of any given league. For example, in a 10 Team League, Player #1 has the 1$^{st}$ Overall Pick, Player #2 has the 20$^{th}$ Overall Pick, and Player #3 has the 21$^{st}$ Overall Pick.

In an auction format, each owner gets to elect one player to be bid on for each round of the draft. The salary cap and roster limits are determined by the commissioner and/or provider of each league before draft day. Owners must draft full rosters based on each leagues salary cap, such as in a 10 Team League, Player #1 has $1,000, Player #2 has $500, Player #3 has $700, and Player #4 has $200. In an auto draft, the Provider of Fantasy Leagues does an auto draft where players are added to a Fantasy Owners Roster based on a predetermined value. These guidelines are established by each individual commissioner and/or provider.

Optionally, within each Fantasy league there is an American Division & National Division. Fantasy Teams with in each division can only draft players from within the National League or American League. They can not select from both leagues. Thus fantasy owners within the American Division can only draft from players within the American League and vice versa.

The number of teams is determined by the commissioner and/or provider before the beginning of each fantasy season. The number of teams that is recommended to play based on this format is between 2-100 teams. However to offer the most ideal player pool for each respective fantasy league, the best option is to offer an 8, 10, 12, and/or 14 fantasy teams with in a given league. These guidelines are established by each individual commissioner and/or provider.

A roster is made up of 18 Field Players & 12 Pitchers. A team should have a minimum of one $1^{st}$ baseman, one $2^{nd}$ baseman, one shortstop, one $3^{rd}$ baseman, one catcher, three outfielders, one starting pitcher, and one relief pitcher. Two injured reserve slots are available to players who are listed by their MLB team as "Injured Reserve," thus allowing the Fantasy Owner to have as many as 16 full time players on their active roster. Player Pools are determined by each respective commissioner; however, the MLB player pool is recommended for usage only.

All lineups are due before the first pitch. If an owner forgets to hand in a line-up (e.g., electronically, in person, telephonically, etc.), the default is that the owner starts the same players started the game before. A team either picks the night the player plays or not specify. In the event that the team does not state what night the player plays, the player stats are calculated based on the first moment the player steps onto the baseball field. Those will be the stats used. A team may start one first baseman, one second baseman, one third baseman, one shortstop, one catcher, three outfielders, one starting pitcher, and one closer/relief pitcher. Additionally, a team may start a reserve player for two positions.

Regular Season games are played over various formats. However the majority of games are played on Monday-Wednesday and Friday-Sunday. In this example, there must be at least a minimum of 20 MLB games played over a three day period. Fantasy Playoff games are played over a three day period. The days playoff games fall on are Friday-Sunday and/or Monday-Wednesday as an example. The number of games in any given year changes based on how many games all owners agree to play. Usually there is between 20-30 Regular Season games that are scheduled for each fantasy season. Fantasy Playoffs are usually 5 rounds long for 10 man leagues. The fantasy season ends two weeks before the MLB regular season ends. This is done to prevent MLB players from being rested and/or benched by their MLB teams for precautionary reasons as would be understood by one skilled in the art of professional baseball.

All free agents are eligible for bidding, and a minimum bid is assigned for a player, whether a team gets the player or not. Players bid on are added to the roster the day before the next game. A team is allowed to place a one-game contract on a player for a fee. After that player has played out his one game contract, the player must be dropped. A salary cap is in place, and if a team goes over the salary cap it pays a fine. Each player traded is charged a fee. Leagues can also allow their owners to pick up players via a waiver wire where each week a Fantasy Owner has first claim on the free agent pool.

Example 3

An Exemplary Embodiment for a Fantasy NASCAR League

The following example is applied to NASCAR, but may be easily adapted to other automobile races. The number of NASCAR race events with in any Fantasy NASCAR League is determined at the beginning of the season by the commissioner and/or provider for each respective league. A fantasy game is played over the duration of 2 races. Certain bonus may be awarded for drivers who win the race or finish in the top ten. What makes this format so unique is the fact that the owner's driver must produce for that particular event in order for the owner's fantasy team to get a victory. What this unique scheduling basis creates is the fantasy game conditions that makes it user place as great an importance on a driver for one racing event.

Generally, the 3 drivers are started by each Fantasy Owner for each race event. The Fantasy owner with the most amount of points gets the victory. Their record determines the seeding for each Fantasy Owner for the playoffs. The most amount of Total Points used act as the first tie breaker in determining fantasy team's rankings with in any given league. The head to head record is used as the last tie breaker in determining overall standings. All these guidelines are established by each individual commissioner and/or provider, however this is the recommended format that should be used.

Under the head to head point based scoring system, scoring is determined and calculated based on total statistics for each fantasy racing event. For example, scoring is based on what place the driver finishes the race. The stats used are based on actual points given to drivers for competing in the race and include wins, finishing position, laps led, laps completed or miles completed, DNF (Did not finish), poles and/or starts. Exemplary points are provided in the following table:

| POLL FINISH | POINTS | POLL FINISH | POINTS |
| --- | --- | --- | --- |
| 1 | 180 | 23 | 94 |
| 2 | 170 | 24 | 91 |
| 3 | 165 | 25 | 88 |
| 4 | 160 | 26 | 85 |
| 5 | 155 | 27 | 82 |
| 6 | 150 | 28 | 79 |
| 7 | 146 | 29 | 76 |
| 8 | 142 | 30 | 73 |
| 9 | 138 | 31 | 70 |
| 10 | 134 | 32 | 67 |
| 11 | 130 | 33 | 64 |
| 12 | 127 | 34 | 61 |
| 13 | 124 | 35 | 58 |
| 14 | 121 | 36 | 55 |
| 15 | 118 | 37 | 52 |
| 16 | 115 | 38 | 49 |
| 17 | 112 | 39 | 46 |
| 18 | 109 | 40 | 43 |
| 19 | 106 | 41 | 40 |
| 20 | 103 | 42 | 37 |
| 21 | 100 | 43 | 34 |
| 22 | 97 | | |

This scoring system is customizable by each individual commissioner and/or provider. This example provides a recommended format that should be used.

Drafts can be conducted based on an actual draft format or an auction based format. In one actual draft format, a commissioner and/or provider decides the draft order before draft day. The fantasy owner drafts his players based on position in his respective draft by what ever order any individual league adapts. The total amount of players drafted is determined by the commissioner and/or provider of any given league. Thus, in a 10 Team League, player #1 obtains the $1^{st}$ overall pick, player #2 obtains the $20^{th}$ overall pick and player #3 obtains the $21^{st}$ overall pick. In accordance with the auction format, each owner gets to elect one player to be bided on for each round of the draft. The salary cap and roster limits are determined by the commissioner and/or provider of each league before draft day. Owners must draft full roster based on each leagues salary cap. For example, in a 10 team league, player #1 has $1,000, player #2 has $500, player #3 has $700, and player #4 has $200. In an auto draft, players are added to a fantasy owners roster based on a predetermined value. all these guidelines are established by each individual commissioner and/or provider. This examples provides a recommended format that should be used.

The number of teams is determined by the commissioner and/or provider before the beginning of each fantasy season. The number of teams that is recommended to play based on this format is between 2-100 teams. However to offer the most ideal player pool for each respective fantasy league, the best option is to offer an 8, 10, 12, and/or 14 fantasy teams with in a given league. All guidelines are established by each individual commissioner and/or provider. This example provides a recommended format that should be used.

Roster sizes are determined as follows: draft 6 drivers; with one injured reserve slot available to a player who is listed by their pit teams as "Injured," thereby allowing the fantasy owner to have as many as 7 full time players on their active roster. Player pools are determined by each respective commissioner, however the NASCAR driver pool is recommended for usage only. All these guidelines are established by each individual commissioner and/or provider. This example provides a recommended format that should be used.

With respect to the line ups, all lineups are due before the beginning of the first race. If an owner forgets to hand in a line-up the owner starts the same drivers as the owner started the last fantasy game; owners start 3 drivers in all; and there is an option of placing two players on reserve for to active event. This is done just incase one of the active driver does not race in the second event. All e guidelines are established by each individual commissioner and/or provider. This example provides a recommended format that could be used.

Regular Season games are played over the duration of two race events, the basis for the statistics compiled are only based on one race event. Bonus categories are awarded to players who win the race. Fantasy Playoff games are played over 10 Racing Events during the NASCAR season. The days most games will be played from Thursday through Sunday. This is done because most Racing Events transpire over those particular days. The number of games in any given year changes based on how many Racing Events all owners agree to play. There are usually 11 Regular Season games that are scheduled for each fantasy season. Fantasy playoffs are usually 5 rounds long for 10 man leagues. These guidelines are established by each individual commissioner and or provider, however this is the recommended format that should be used.

Shown below is an example of how 1 fantasy game is played over a Racing Event. Owners start 3 drivers for each race (1 from each tier optional). The winner is determined by who scores the most points for that race, such as in the following example:

| Players | Race | Finish | Points |
|---|---|---|---|
| | Team #1 | | |
| Earnhardt Jr. | Daytona | 2 | 170 |
| Rickey Rudd | Auto Club | 7 | 146 |
| Ryan Newman | Daytona | 15 | 118 |
| Total Points | | | 434 |
| | Team #2 | | |
| Travis Bickle | Daytona | 5 | 155 |
| Rusty Wallace | Auto Club | 6 | 150 |
| Jimmy Johnson | Auto Club | 12 | 127 |
| Total Points | | | 432 |

Box Score

| TEAMS | SCORE |
|---|---|
| TEAM #1 | 434 |
| TEAM #2 | 432 |

Standings

| TEAMS | RECORD | POINTS |
|---|---|---|
| TEAM #1 | (1-0) WIN/LOSS | 434 |
| TEAM #2 | (0-1) WIN/LOSS | 432 |

These guidelines are established by each individual commissioner and or provider. This example provides a recommended format that should be used.

With respect to player transactions, all free-agents are eligible for bidding; 2) minimum bid for a player is $1, whether owners get the player or not; 3) players bided on are add to the opponents roster the day before the next game; 4) owners are allowed to place a 1 race contract on a player for $1 (after that player has completed that particular race, the player must be dropped); 5) a salary cap is in place, if an owner goes over the salary cap the owner pays for each dollar the owners go over; 6) each player traded costs money; and 7) leagues can also allow their owners to pick up players via a waiver wire where each week, wherein a fantasy owner has first choice on the free-agent pool. These guidelines are established by each individual commissioner and/or provider.

Example 4

An Exemplary Embodiment for a Fantasy Basketball League Using the NBA

Basketball fantasy leagues are determined at the beginning of the season by the commissioner and/or provider for each respective league and preferably with input from team owners. A fantasy game can be played over four- to seven-day span; or over three-day span; or over a two-day span. This allows you to schedule two fantasy games a week using the three-day format or three fantasy games a week using the two-day format or one fantasy game a week using the four- to seven-day format. The commissioner and/or provider of each respective league determines how many games are played during their fantasy season. The fantasy owner gets to pick one night that his respective player stats will be used in his head-to-head competition with his fantasy opponent over an extended fantasy game night (2, 3, or 4-7).

The six players who are started by each Fantasy Owner for each game have their statistics calculated individually and then added together to determine the Team points. The fantasy owner with the most points gets the victory. The record determines the seeding for each Fantasy Owner for the playoffs. Total Points are used as the first tiebreaker in determining fantasy teams' rankings within any given league. The head-to-head record is used as the last tiebreaker in determining overall standings.

Generally, the customizable parameters of any fantasy league, including this exemplary league, are established by one or more of the commissioner, the team owners, or the provider.

Exemplary individual player's statistics may include:

| | |
|---|---|
| Points | Field Goal Percentage |
| Free Throw Percentage | Three-point Percentage |
| Two-point Percentage | Points Per Shot |
| Shooting Efficiency | Rebounds |
| Assists | Steals |
| Blocks | Fouls |
| Minutes Played | Turnovers |
| Assist/Turnover Ratio | Steals/Turnover Ratio |
| Steals/Foul Ratio | Blocks/Foul Ratio |
| Double Doubles | Triple Doubles |

Bonus scoring may be used as well. Examples include 50 or more points by one player in a game; 20 or more rebounds by one player in a game; and 20 or more assists by one player in a game.

This is a head to head point based scoring system. Scoring is calibrated (i.e., calculated) based on total stats for each fantasy game.

Shown below is an example of how we would recommend our leagues to conduct their leagues based on our format.

| Category | Point(s) |
|---|---|
| Rebounds | 1 |
| Scoring | 1 |
| Assists | 1 |
| Blocks | 1.5 |
| Steals | 1.5 |
| Double Double | 5 |
| Triple Double | 10 |
| Quadruple Double | 20 |
| 50 Points | 5 |
| 20 Rebounds | 5 |
| 20 Assists | 5 |

Drafts can be conducted based on an actual draft format or an auction based format. In one draft format, a commissioner and/or provider decides the draft order before draft day. Fantasy owner drafts his players based on position in his respective draft by what ever order any individual league adapts. The total amount of players drafted is determined by the commissioner and/or provider of any given league. For example, in a 10 Team League, Player #1 has the 1$^{st}$ Overall Pick, Player #2 has the 20$^{th}$ Overall Pick, and Player #3 has the 21$^{st}$ Overall Pick.

In an auction format, each owner gets to elect one player to be bid on for each round of the draft. The salary cap and roster limits are determined by the commissioner and/or provider of each league before draft day. Owners must draft full rosters based on each leagues salary cap, such as in a 10 Team League, Player #1 has $1,000, Player #2 has $500, Player #3 has $700, and Player #4 has $200.

In an auto draft, the Provider of Fantasy Leagues does an auto draft where players are added to a Fantasy Owners Roster based on a predetermined value.

The number of teams is determined by the commissioner and/or provider before the beginning of each fantasy season. The number of teams that is recommended to play based on this format is between 2-100 teams. However, to offer the most ideal player pool for each respective fantasy league, the best option is to offer an 8, 10, 12, and/or 14 fantasy teams within a given league.

A roster is made up of three centers, five forwards, and five guards. Two Injured Reserve slots are available to players who are listed by their NBA team as "Injured Reserve," thus allowing the Fantasy Owner to have as many as 15 full time players on their active roster. Player Pools are determined by each respective commissioner, however the NBA player pool is recommended for usage only. Additionally, guards must not be taller than 6 feet, 7 inches, and must be listed in the NBA as a "Point Guard", "Shooting Guard", or "Small Forward." Forwards must be 6 feet, 5 inches or taller and must also be listed in the NBA as a "Shooting Guard" "Small Forward" or "Power Forward." Centers must be 6 feet, 10 inches or taller, and must be listed in the NBA as a "Power Forward" or "Center."

All lineups are due before tip-off. If an owner forgets to hand in a line-up, the owner starts the same players started in the game before. There are two ways in submitting a lineup. A team either picks the night the player plays or does not specify. In the event that the team does not state what night the player plays; the player stats are calibrated based on the first moment he steps onto the basketball court. Those will be the stats used. A team may start one center, two forwards, two guards, and one sixth man. Additionally, a team may start a reserve player for two positions.

Regular Season games are played over two day period. The days all our games are played are Tuesday-Wednesday and Friday-Saturday. There must be a minimum of 15 NBA games played over a two day period. Fantasy Playoff games are played over a three day period. The days playoff games fall on are Friday-Sunday and/or Monday-Wednesday. The number of games in any given year changes based on how many games all owners agree to play. Usually there are between 20-30 Regular Season games that are scheduled for each fantasy season. Fantasy Playoffs are usually 5 rounds long. The fantasy season ends two weeks before the NBA regular season ends. This is done to prevent NBA players from being rested and/or benched by their NBA teams for precautionary reasons.

Shown below is an example of how one fantasy game is played over a two day format. Two guards, two forwards, one center, and one sixth man are used in this example.

| Position | Player | Fri | Sat | Box Score | Fantasy Score |
|---|---|---|---|---|---|
| | | | Team #1 | | |
| Center | Shaquille O'Neal | X | | 20 pts, 10 rebs, 3 blks | 39.5 |
| Forward | Kevin Garnett | | X | 15 pts, 9 reb, 2 asts, 2 blks | 30 |

-continued

| Position | Player | Fri | Sat | Box Score | Fantasy Score |
|---|---|---|---|---|---|
| Forward | Tim Duncan | | X | 20 pts, 20 rebs, 4 blks | 56 |
| Guard | Jason Kidd | X | | 12 pts, 12 asts, 4 stls | 35 |
| Guard | Allen Iverson | X | | 50 pts, 3 asts, 3 rebs, 4 stls | 68 |
| 6th Man | Vince Carter | | X | 25 pts, 5 asts, 5 rebs, 1 stl, 1 blk | 38 |
| | | | | | 266.5 |
| | | Team #2 | | | |
| Center | Yao Ming | X | | 15 pts, 10 rebs, 4 blks | 36 |
| Forward | Chris Webber | X | | 20 pts, 5 reb, 5 asts, 2 blks | 33 |
| Forward | Kenyon Martin | | X | 15 pts, 15 rebs, 5 asts, 3 blks, stls | 47.5 |
| Guard | Steve Nash | | X | 10 pts, 15 asts, 4 rebs, 2 stls | 37 |
| Guard | Dwyane Wade | X | | 20 pts, 10 asts, 5 rebs, 2 stls | 43 |
| 6th Man | Richard Jefferson | X | | 20 pts, 12 asts, 10 rebs, 3 stls | 56.5 |
| | | | | | 253 |

| BOX SCORE | |
|---|---|
| | GAME |
| TEAM #1 | 266.5 |
| TEAM #2 | 253 |

| STANDINGS | | |
|---|---|---|
| | RECORD (W-L) | TOTAL POINTS |
| TEAM #1 | 1-0 | 266.5 |
| TEAM #2 | 0-1 | 253 |

There is also an alternative way to score points. Each individual statistic can be played against each fantasy opponent. The Fantasy team with the most points in a statistical category receives 1 point. Even though this is only illustrated for basketball in this example, this can be applied to all sports mentioned in the present invention.

Example:

| | Points | Assists | Rebounds | Blocks | Steals |
|---|---|---|---|---|---|
| Team #1 | 142 | 22 | 47 | 10 | 9 |
| Team #2 | 100 | 47 | 39 | 9 | 6 |
| Team #1 | 1 | 0 | 1 | 1 | 1 |
| Team #2 | 0 | 1 | 0 | 0 | 0 |

| Standings | | |
|---|---|---|
| | Record | Total Points |
| Team #1 | 1-0 | 4 |
| Team #2 | 0-1 | 1 |

Commissioners, Owners and/or Providers also decides on the number of starters, bench sizes and value of each statistic (bonus options) used by any given league.

All free agents are eligible for bidding, and a minimum bid is assigned for a player, whether a team gets the player or not. Players bid on are added to the roster the day before the next game. A team is allowed to place a one-game contract on a player for a fee. After that player has played out his one game contract, he must be dropped. A salary cap is in place, and if a team goes over the salary cap it pays a fine. Each player traded is charged a fee. Leagues can also allow their owners to pick up players via a waiver wire where each week a Fantasy Owner has first claim on the free agent pool.

Example 5

An Exemplary Embodiment for a Fantasy Hockey League Using the NHL

Hockey fantasy leagues are determined at the beginning of the season by the commissioner and/or provider for each respective league. A fantasy game can be played over spans of 2, 3, or 4-7 days. This allows an owner to schedule two fantasy games a week using the 3-day format or 3 fantasy games a week using the 2-day format or 1 fantasy game a week using the 4-7 day format. The commissioner and/or provider of each respective league determines how many games are played during their fantasy season. The fantasy owner gets to pick one night when the owner's player stats will be used in his head-to-head competition with his fantasy opponent over an extended fantasy game night (2, 3, or 4-7).

The six players who are started by each Fantasy Owner for each game have their statistics added. The fantasy owner with the most points gets the victory. The record determines the winner or the seeding for each Fantasy Owner for the play-offs. Total Points are used as the first tie breaker in determining fantasy teams' rankings within any given league. The head-to-head record is used as the last tiebreaker in determining overall standings.

| PLAYER STATISTICS | |
|---|---|
| GP | Games played |
| G | Goals |
| A | Assists |
| PTS | Points |
| SOG | Shots on goal |
| +/− | Plus-minus rating |
| | *A skater gets a +1 if he is on the ice when his team scores an even-strength or shorthanded goal. He gets a −1 if he is on the ice when his team allows an even-strength or shorthanded goal. This does not apply to goalies. |
| PPG | Power-play goals |
| PPA | Power-play assists |
| SHG | Shorthanded goals |
| SHA | Shorthanded assists |
| PIM | Penalty minutes |
| TOI | Time on ice |
| SHFT | Shifts |
| FOW | Faceoffs won |
| FOL | Faceoffs lost |
| FO % | Faceoff percentage |
| PROD | Production value: the average ice time per point recorded. |
| | *For example, if a player is on the ice for 20 minutes and registers two points, his production value is 10:00 |

| GOALIE STATS | |
|---|---|
| GP | Games played |
| W | Wins |
| L | Losses |
| T | Ties |
| GAA | Goals against average |
| | *The number of non-empty net goals allowed by a goalie per 60 minutes. |

-continued

| | GOALIE STATS |
|---|---|
| SV | Saves |
| SV % | Save percentage |
| | *The total saves divided by the total shots faced. |
| SO | Shutouts |
| TGA | Total goals allowed |
| TSA | Total shots against |

Any form of bonus scoring that the commissioner and/or provider choose to use for any given league may be implemented. For example, bonus scoring may be awarded for a "Hat Trick" (i.e., three goals by one player in a single game). This league in this example is a head-to-head point based scoring system. Scoring is calibrated based on total stats for each fantasy game.

Shown below is an example of how we would recommend our leagues to conduct their leagues based on our format.

| Category | Points |
|---|---|
| Offensive/Defensive Players | |
| Goals | 2 |
| Assists | 1 |
| Shorthanded Goal | .5 |
| Hat trick | +5 |
| Goalies | |
| Goals Given Up | −4 |
| Saves | .5 |
| Shut Out | 10 |
| Win | 5 |
| Loss | −5 |

Drafts can be conducted based on an actual draft format or an auction based format. In one draft format, a commissioner and/or provider decides the draft order before draft day. Fantasy owner drafts his players based on position in his respective draft by what ever order any individual league adapts. The total amount of players drafted is determined by the commissioner and/or provider of any given league. For example, in a 10 Team League, Player #1 has the $1^{st}$ Overall Pick, Player #2 has the $20^{th}$ Overall Pick, and Player #3 has the $21^{st}$ Overall Pick.

In an auction format, each owner gets to elect one player to be bid on for each round of the draft. The salary cap and roster limits are determined by the commissioner and/or provider of each league before draft day. Owners draft full rosters based on each leagues salary cap, such as in a 10 Team League, Player #1 has $1,000, Player #2 has $500, Player #3 has $700, and Player #4 has $200. In an auto draft, the Provider of Fantasy Leagues does an auto draft where players are added to a Fantasy Owners Roster based on a predetermined value. These guidelines are established by each individual commissioner and/or provider.

The number of teams is determined by the commissioner and/or provider before the beginning of each fantasy season. The number of teams that is recommended to play based on this format is between 2-100 teams. However to offer the most ideal player pool for each respective fantasy league, the best option is to offer an 8, 10, 12, and/or 14 fantasy teams within a given league.

A roster is made up of three goalies, five defensemen, and six forwards. Two injured reserve slots are available to players who are listed by their NHL team as "Injured Reserve," thus allowing the Fantasy Owner to have as many as 16 full time players on their active roster. Player Pools are determined by each respective commissioner; however, in this example, the NHL player pool is recommended only.

All lineups are due before the first face off. If an owner forgets to hand in a line up the owner starts the same players started in the game before. There are at least two ways to submit a lineup. A team either picks the night the player plays or not specify. In the event that the team does not state what night the player plays; the player stats are calibrated based on the first moment he steps onto the ice. Those will be the stats used. A team may start one goalie, three forwards, and two defensemen. Additionally, a team may start a reserve player for two positions.

Regular season games are played over a two-day period. The majority of games are played on either Tuesday-Wednesday or Friday-Saturday. In this example, there must be a minimum of 15 NHL games played over a two day period. Fantasy Playoff games are played over a three day period. The playoff games fall on either Friday-Sunday or Monday-Wednesday. The number of games in any given year changes based on how many games all owners agree to play. Usually there is between 20-30 Regular Season games that are scheduled for each fantasy season. Fantasy Playoffs are usually 5 rounds long for 10 man leagues. The fantasy season ends two weeks before the NHL regular season ends. This is done to prevent NHL players from being rested and/or benched by their NHL teams for precautionary reasons.

Shown below is an example of how one fantasy game is played over a two-day format. One goalie, two defensemen, and three forwards are started.

| Position | Player | Fri | Sat | Box Score | Fantasy Score |
|---|---|---|---|---|---|
| | Team #1 | | | | |
| F | Patrik Elias (NJ) | X | | 1 GL, 1 AST | 3 |
| F | Milan Hejduk (TB) | | X | 2 AST | 2 |
| F | Mats Sundin (TOR) | | X | 2 GL | 4 |
| D | Brian Leetch (TOR) | X | | 3 AST | 3 |
| D | Bryan Berard (CHI) | X | | 0 | 0 |
| G | Martin Brodeur (NJ) | | X | 21 Saves, Win, 2 Goals Given Up | 7.5 00 |
| | | | | TOTAL | 19.5 |
| | Team #2 | | | | |
| F | Markus Naslund (COL) | X | | 3 GLS | 9 |
| F | Todd Bertuzzi (BOS) | | X | 1 AST | 1 |
| F | Peter Forsberg (TOR) | | X | 2 GLS, 1 AST | 5 |
| D | Al MacInnis (STL) | X | | 1 AST | 1 |
| D | Nicklas Lidstrom (DET) | X | | 1 GL | 2 |
| G | Steve Shields (FL) | | X | 28 Saves, Loss, 1 Goal Given Up | 4 00 |
| | | | | TOTAL | 22 |

| BOX SCORE | |
| --- | --- |
| | GAME 1 |
| TEAM #1 | 19.5 |
| TEAM #2 | 22 |

| STANDINGS | | |
| --- | --- | --- |
| | RECORDS (W-L) | TOTAL POINTS |
| TEAM 2 | 1-0 | 22 |
| TEAM 1 | 0-1 | 19.5 |

All free agents are eligible for bidding, and a minimum bid is assigned for a player, whether a team gets the player or not. Players bid on are added to the roster the day before the next game. A team is allowed to place a one-game contract on a player for a fee. After that player has played out his one game contract, the player must be dropped. A salary cap is in place, and if a team goes over the salary cap it pays a fine. Each player traded is charged a fee. Leagues can also allow their owners to pick up players via a waiver wire where each week a Fantasy Owner has first claim on the free agent pool.

Example 6

An Exemplary Embodiment for a Fantasy Golf League Using the PGA and LPGA

For the following example, PGA and LPGA events may be used interchangeably or in conjunction, thereby creating a male and female player pool. The number of PGA tour events within any Fantasy PGA League is determined at the beginning of the season by the commissioner and/or provider for each respective league. A fantasy game is played over a four day span of whatever major tournaments that have been incorporated into any given fantasy golf season. The fantasy owner picks three golfers, whom the owner will start for the duration of the $1^{st}$ through $4^{th}$ rounds of any given tournament that falls on a particular fantasy game night. You must pick only one round that that golfers stats will be played (i.e., used towards fantasy scoring). The three golfers play as a team, which is a format consistent with and similar to the current Ryder Cup system. Certain bonus points will be awarded if that golfer goes on to win the tournament, such as if the golfer makes a cut or finishes within the top ten of any given tournament.

In head-to-head competition, the three players that are started by each Fantasy Owner for each game have their statistics added. The fantasy owner with the least amount of points gets the victory. Record determines the seeding for each Fantasy Owner for the playoffs. The least amount of Total Points is the determination used as the first tie breaker in determining fantasy teams rankings with in any given league. Head to Head record is used as the last tie breaker in determining overall standings.

Statistics are maintained in each of these categories: Eagles; Birdies; Pars; Bogeys; Birdies per round; Hole in One; Scoring Average; Number of Strokes; Yards Per Drive; Drive Accuracy; Greens In Regulation; Putting Average; Events; Rounds; Cuts Made; Top Tens; and Wins.

This is a head to head point based scoring system. Scoring is calibrated based on total stats for each fantasy game.

Shown below is an example of how we would recommend our leagues to conduct their leagues based on our format.

| Category | Points |
| --- | --- |
| Win | −10 |
| Cuts Made | −2 |
| Top Tens | −5 |
| Number of Strokes | 1 |

Drafts can be conducted based on an actual draft format or an auction based format. In one draft format, a commissioner and/or provider decides the draft order before draft day. Fantasy owner drafts his golfers based on position in his respective draft by what ever order any individual league adapts. The total amount of players drafted is determined by the commissioner and/or provider of any given league. For example, in a 10 Team League, Player #1 has the $1^{st}$ Overall Pick, Player #2 has the $20^{th}$ Overall Pick, and Player #3 has the $21^{st}$ Overall Pick.

In an auction format, each owner gets to elect one player to be bid on for each round of the draft. The salary cap and roster limits are determined by the commissioner and/or provider of each league before draft day. Owners must draft full rosters based on each leagues salary cap, such as in a 10 Team League, Player #1 has $1,000, Player #2 has $500, Player #3 has $700, and Player #4 has $200.

In an auto draft, the Provider of Fantasy Leagues runs an auto draft where players are added to a Fantasy Owners Roster based on a predetermined value.

These guidelines are established by each individual commissioner and/or provider.

The number of teams is determined by the commissioner and/or provider before the beginning of each fantasy season. The number of teams that is recommended to play based on this format is between 2-100 teams. However to offer the most ideal player pool for each respective fantasy league, the best option is to offer an 8, 10, 12, and/or 14 fantasy teams with in a given league.

These guidelines are established by each individual commissioner and/or provider.

A roster is generally made up of six golfers. One injured reserve slot is available to a player who is listed by the PGA as "Injured Reserve," thus allowing the Fantasy Owner to have as many as seven full-time players on their active roster. Player Pools are determined by each respective commissioner. In this example, the PGA player pool is used.

All lineups are due before the first tee shot. If an owner forgets to hand in a line-up the owner starts the same players started in the last fantasy game. Each owner starts three golfers in all and must select one night that your golfer plays. Owners also have the option of placing two players on reserve for each active golfer. This is done just in case one of the active golfers does not play in the second round.

Regular Season games are played over the duration of a tournament, while the basis for the statistics compiled are only based on the $1^{st}$ through $4^{th}$ rounds of each tournament. Fantasy Playoff games are played over the last five tournaments during the PGA tour. The days most games will be played is Thursday through Sunday. This is done because most tournaments are played on those particular days. The number of games in any given year changes based on how many games all owners agree to play. Usually there are 15 Regular Season games that are scheduled for each fantasy season. Fantasy Playoffs are usually 5 rounds long for 10 man leagues.

All free agents are eligible for bidding, and a minimum bid is assigned for a player, whether a team gets the player or not.

Players bid on are added to the roster the day before the next game. A team is allowed to place a one-game contract on a player for a fee. After that player has played out his one game contract, the player must be dropped. A salary cap is in place, and if a team goes over the salary cap it pays a fine. Each player traded is charged a fee. Leagues can also allow their owners to pick up players via a waiver wire where each week a Fantasy Owner has first claim on the free agent pool.

Shown below is an example of how 1 fantasy game is played over a tournament. Three golfers are started.

| PLAYERS | HOLES | | | | | | | | | | HOLES | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | OUT | 10 | 11 | 12 | 13 | 14 | 15 | 16 | 17 | 18 | IN | TOT |
| TEAM 1 | | | | | | | | | | | | | | | | | | | | | |
| PAR | 4 | 5 | 4 | 3 | 4 | 3 | 4 | 5 | 4 | 36 | 4 | 4 | 3 | 5 | 4 | 5 | 3 | 4 | 4 | 36 | 72 |
| Fred Couples (1$^{st}$ Round) | 4 | 5 | 5 | 4 | 4 | 4 | 4 | 3 | 3 | 36 | 4 | 3 | 4 | 3 | 5 | 4 | 4 | 4 | 3 | 34 | 70 |
| Colin Montgomery (4$^{th}$ Round) | 4 | 5 | 3 | 4 | 4 | 4 | 4 | 3 | 4 | 35 | 4 | 3 | 4 | 3 | 6 | 4 | 4 | 4 | 4 | 36 | 71 |
| Thomas Bjorn (1$^{st}$ Round) | 4 | 3 | 4 | 4 | 4 | 4 | 4 | 3 | 4 | 34 | 4 | 2 | 6 | 3 | 5 | 3 | 4 | 4 | 4 | 35 | 69 |
| TOTALS | | | | | | | | | | | | | | | | | | | | | 210 |
| TEAM 2 | | | | | | | | | | | | | | | | | | | | | |
| PAR | 4 | 5 | 4 | 3 | 4 | 3 | 4 | 5 | 4 | 36 | 4 | 4 | 3 | 5 | 4 | 5 | 3 | 4 | 4 | 36 | 72 |
| Vijay Singh (2$^{nd}$ Round) | 4 | 5 | 5 | 4 | 4 | 4 | 4 | 3 | 3 | 36 | 4 | 3 | 4 | 5 | 4 | 5 | 3 | 4 | 4 | 36 | 72 |
| Tiger Woods (1$^{st}$ Round) | 4 | 5 | 3 | 4 | 4 | 4 | 4 | 3 | 4 | 35 | 4 | 3 | 4 | 3 | 6 | 4 | 4 | 4 | 4 | 36 | 71 |
| Ernie Els (3$^{rd}$ Round) | 4 | 4 | 4 | 4 | 4 | 4 | 4 | 3 | 4 | 35 | 4 | 2 | 6 | 3 | 5 | 3 | 4 | 4 | 5 | 36 | 71 |
| TOTALS | | | | | | | | | | | | | | | | | | | | | 214 |

| BOX SCORE | |
|---|---|
| TEAMS | SCORE |
| TEAM #1 | 210 |
| TEAM #2 | 214 |

| STANDINGS | | |
|---|---|---|
| TEAMS | RECORD | PTS |
| TEAM #1 | 1-0 | 210 |
| TEAM #2 | 0-1 | 214 |

It should be noted that in golf the team that scores the lowest score, wins the game. Also note that in golf a lower score determines what team is in what place. The team with the least amount of points will get the higher rank in standings. Unlike in this golf example, in each of the other examples, the fantasy winner typically has the highest score.

Example 7

An Exemplary Embodiment for a Fantasy Soccer League Using International Soccer Organizations The Fantasy Soccer Premier Leagues are determined at the beginning of the season by the commissioner and/or provider for each respective league. A fantasy game can be played over a four- to seven-day span, a three-day span, or a two-day span. This allows you to schedule two fantasy games a week using the three-day format, or three fantasy games a week using the two-day format, or one fantasy game a week using the four- to seven-day format. The commissioner and/or provider of each respective league determines how many games are played during their fantasy season. The fantasy owner gets to pick one night that his respective player stats will be used in his head-to-head competition with his fantasy opponent over an extended fantasy game night (2, 3, or 4-7).

Due to the format of this unique scheduling concept, a large enough player pool must be available to fantasy owners to draft full fantasy rosters. In order to address this issue with respect to a player pool, the commissioner and/or provider can pick as few as two leagues or as many Leagues as he deems necessary. This example incorporates players from any soccer organization that provide statistical information regarding its players. Examples of the possible Leagues to choose from include, without limitation, the English Premier League, German Premier League, French Premier League, Spanish Premier League, Italian Premier League, Dutch Premier League, Scottish Premier League, Portuguese Premier League, Turkish Premier League, Austrian Premier League, Swedish Premier League, Finnish Premier League, Russian Premier League, Polish Premier League, Greek Premier League, Irish Premier League, Brazilian Premier League, Argentinean Premier League, Mexican Premier League, MLS Premier League (US), Chinese Premier League, Japanese Premier League, Indian Premier League, and the Australian Premier League.

The Following Leagues are the recommended leagues to use for the respective player pools, all which play on Saturdays and Sundays.

| League | No. of Teams | Season Starts | Season Ends |
|---|---|---|---|
| English Premier League | 20 | August | April |
| French Premier League | 20 | August | March |
| German Premier League | 18 | August | February |
| Italian Premier League | 20 | August | March |
| Spanish Premier League | 20 | August | March |

Generally, eleven players are started by each Fantasy Owner for each game, and these players have their statistics added and converted to fantasy scores. The fantasy owner with the most points gets the victory. The record determines the seeding for each Fantasy Owner for the playoffs. Total Points are used as the first tiebreaker in determining fantasy teams' rankings with in any given league. The head-to-head record is used as the last tiebreaker in determining overall standings.

Conventional soccer statistics include:

| | |
|---|---|
| Shots | Goals |
| Assists | Fouls |
| Fouls Drawn | Yellow Card |
| Red Card | Offside |
| Saves | Goals Given Up |

Bonus Options include a Hat Trick, for example.

In this example, the scoring is a head-to-head point based scoring system. Scoring is calibrated (i.e., calculated) based on total stats for each fantasy game. Shown below is an example of how we would recommend our leagues to conduct their leagues based on our format.

| Category | Points |
|---|---|
| Offensive/Defensive Players | |
| Goals | 2 |
| Assists | 1 |
| Hat trick | +3 |
| Goalies | |
| Goals Given Up | −2 |
| Saves | .5 |
| Shut Out | +2 |

Drafts can be conducted based on an actual draft format or an auction based format. In one draft format, a commissioner and/or provider decides the draft order before draft day. Fantasy owner drafts his players based on position in his respective draft by what ever order any individual league adapts. The total amount of players drafted is determined by the commissioner and/or provider of any given league. For example, in a 10 Team League, Player #1 has the $1^{st}$ Overall Pick, Player #2 has the $20^{th}$ Overall Pick, and Player #3 has the $21^{st}$ Overall Pick.

In an auction format, each owner gets to elect one player to be bid on for each round of the draft. The salary cap and roster limits are determined by the commissioner and/or provider of each league before draft day. Owners must draft full rosters based on each leagues salary cap, such as in a 10 Team League, Player #1 has $1,000, Player #2 has $500, Player #3 has $700, and Player #4 has $200.

In an auto draft, the Provider of Fantasy Leagues does an auto draft where players are added to a Fantasy Owners Roster based on a predetermined value.

The number of teams is determined by the commissioner and/or provider before the beginning of each fantasy season. The number of teams that is recommended to play based on this format is between 2-100 teams. However, to offer the most ideal player pool for each respective fantasy league, the best option is to offer an 8, 10, 12, and/or 14 fantasy teams within a given league.

A roster is made up of three goalies and twenty offensive players. Two Injured Reserve slots are available to players who are listed by their Premier team as "Injured Reserve," thus allowing the Fantasy Owner to have as many as 25 full time players on their active roster.

All lineups are due prior to the beginning of each game. If an owner forgets to hand in a line-up he starts the same players as he started the game before. There are two ways in submitting a lineup. A team either picks the night the player plays or does not specify. In the event that the team does not state what night the player plays; the player stats are calibrated based on the first moment he steps onto the field. Those will be the stats used. A team may start one goalie and ten offensive players. Additionally, a team may start a reserve player for two positions.

Regular Season games are played over a three-day period. The days all our games are played are Friday-Sunday. There must be a minimum of 30 Premier teams playing over that three-day period. Fantasy Playoff games are also played over a three-day period. The days playoff games fall on are Friday-Sunday. The number of games in any given year changes based on how many games all owners agree to play. Usually there are between 20-30 Regular Season games that are scheduled for each fantasy season. Fantasy Playoffs are usually 5 rounds long for 10-man leagues. The fantasy season ends two weeks before the first Premier teams regular season ends. This is done to prevent soccer players from being rested and/or benched by their Premier teams for precautionary reasons. If an owner were to use the Spanish, English, French, German, and Italian Premier Leagues, the fantasy season would have to be played during the months of September to February, because all five of those leagues have their teams playing during those months.

Format:

| Position | Player Name | League | FRI | SAT | SUN | Box Score | Total Points |
|---|---|---|---|---|---|---|---|
| | | TEAM #1 | | | | | |
| OF | Mickael Pagis | French (Strasbourg) | X | | | 1 GL | 2 |
| OF | Alexander Frei | French (Rennes) | | X | | 1 AST | 1 |
| OF | Thierry Henry | England (Arsenal) | | | X | 0 | 0 |
| OF | Mark Mintal | German (Nornberg) | | | X | 2 AST | 2 |
| OF | Waldir Lucas Peraira | French (AC Ajaccio) | | | X | 1 GL | 2 |
| OF | Claudio Pizzaro | German (Bayern Munich) | X | | | 1 AST | 1 |

-continued

| Position | Player Name | League | FRI | SAT | SUN | Box Score | Total Points |
|---|---|---|---|---|---|---|---|
| OF | Andriy Sherchenko | Italy (AC Milan) | | | X | 0 | 0 |
| OF | Samuel Eto'o | Spain (Barcelona) | | X | | 0 | 0 |
| OF | Ziatan Ibrahimovic | Italy (Juventus) | X | | | 1 AST | 1 |
| OF | Luiz Ronaldo | Spain (Real Madrid) | | X | | 2 GL | 4 |
| GL | Tim Howard | England (Man United) | | | X | 10 Saves 1 Goal | 3 |
| | | | | TOTAL | | | 16 |
| | | TEAM #2 | | | | | |
| OF | Marama Vahirua | French (Nice) | | X | | 3 GLS | 6 |
| OF | Olivier Monterubbie | French (Rennes) | X | | | 1 AST | 1 |
| OF | Roy Makaay | German (Bayern Munich) | | | X | 0 | 0 |
| OF | Sergej Barbarez | German (Hamberg) | | X | | 0 | 0 |
| OF | Andrej Voronin | German (Bayer) | | | X | 0 | 0 |
| OF | Fabrizio Miccoli | Italy (Fiorentina) | X | | | 1 GL, 2 AST | 4 |
| OF | Vincenzo Iaquinta | Italy (Udinese) | X | | | 1 AST | 1 |
| OF | Christian Vieri | Italy (Inter Milan) | | X | | 1 GL, 2 AST | 4 |
| OF | Luis Edu | Spain (Real Betis) | | X | | 0 | 0 |
| OF | Michael Owens | Spain (Real Madrid) | | X | | 0 | 0 |
| GL | Jens Lehmann | England (Arsenal) | | | X | 8 Saves 1 Goal | 2 |
| | | | | TOTAL | | | 18 |

| BOX SCORE | |
|---|---|
| TEAM | SCORE |
| TEAM #1 | 16 |
| TEAM #2 | 18 |

| STANDINGS: | | |
|---|---|---|
| TEAM | RECORD | POINTS |
| TEAM #2 | 1-0 | 18 |
| TEAM #1 | 0-1 | 16 |

All free agents are eligible for bidding, and a minimum bid is assigned for a player, whether a team gets the player or not. Players bid on are added to the roster the day before the next game. A team is allowed to place a one-game contract on a player for a fee. After that player has played out his one game contract, he must be dropped. A salary cap is in place, and if a team goes over the salary cap it pays a fine. Each player traded is charged a fee. Leagues can also allow their owners to pick up players via a waiver wire where each week a Fantasy Owner has first claim on the free agent pool.

Example 8

An Exemplary Embodiment for a Fantasy Collegiate Basketball League

Generally, NCAA fantasy leagues are determined at the beginning of the season by the commissioner and/or provider (i.e., a server hosting the fantasy system or the system itself) for each respective league. A fantasy game can be played over four to seven day span; or over three day span; or over a two day span. This allows you to schedule 2 fantasy games a weeks using the three day format or 3 fantasy games a week using the two day format or 1 fantasy game a week using the 4-7 day format. The commissioner and/or provider of each respective league determines how many games are played during their fantasy season. The fantasy owner gets to pick one night that his respective player stats will be used in his head to head competition with his fantasy opponent over an extend fantasy game night (e.g., 2, 3, or 4-7).

Due to the format of this unique scheduling concept, a large enough player pool must be available to fantasy owners to draft full fantasy rosters. In order to address this issue with respects to a player pool, the Commissioner and/or Provider can pick between any number of NCAA Conferences or other college sports leagues, associations and/or organizations to use including, for example, America East Conference, Atlantic 10 Conference, Atlantic Coast Conference, Atlantic Sun Conference, Big 12 Conference, Big East Conference, Big Sky Conference, Big South Conference, Big Ten Conference, Big West Conference, Colonial Athletic Conference, Conference USA, Division I Independents, Horizon League; Ivy League, Metro Atlantic Athletic Conference, Mid Continent Conference, Mid American Conference, Mid Eastern Athletic Conference, Missouri Valley Conference, Mountain West Conference, North East Conference, Ohio Valley Conference, Pacific 10 Conference, Patriot League, Southeastern Conference, Southern Conference, Southland Conference, Southwestern Athletic Conference, Sun Belt Conference, West Coast Conference, and Western Athletic Conference.

In this example, the 6 players who are started by each Fantasy Owner for each game have their statistics added. The fantasy owner with the most points gets the victory. The record determines the seeding for each Fantasy Owner for the playoffs. Total Points are used as the first tie breaker in determining fantasy teams' rankings with in any given league. The head to head record is used as the last tie breaker in determining overall standings. These guidelines may be customized by each individual commissioner and/or provider.

Exemplary Individual Players Basketball Statistics used are: Points, Field goal Percentage, Free Throw Percentage, Three Point Percentage, Two Point Percentage, Points Per Shot, Shooting Efficiency, Assists, Steals, Blocks, Fouls, Minutes Played, Turnovers, Assist/Turnover Ratio, Rebounds, Steals/Turnover Ratio, Steals/Foul Ration, Blocks/Foul Ratio, Double Doubles, and Triple Doubles. An additional bonus may be awarded consistent with any form of scoring that any commissioner and/or provider choose to use for any given league, such as bonuses for 50+ Points, 20+ Rebounds, and/or 20+ Assists This is a head to head point based scoring system. Scoring is determined and/or calculated based on total stats for each fantasy game. Shown below is an example of point scoring. All guidelines can be established by each individual commissioner and/or provider.

| Category | Points |
| --- | --- |
| Rebounds | 1 |
| Scoring | 1 |
| Assists | 1 |
| Blocks | 1.5 |
| Steals | 1.5 |
| Double Double | 5 |
| Triple Double | 10 |
| Quadruple Double | 20 |
| 50 Points | 5 |
| 20 Rebounds | 5 |
| 20 Assist | 5 |

Drafts can be conducted based on an actual draft format or an auction based format. The player pools are generally determined before the draft as to what players can be drafted from what active conferences which were previously selected by the commissioner and/or provider. In this example, a commissioner and/or provider decides the draft order before draft day. Fantasy owner drafts his players based on position in his respective draft by what ever order any individual league adapts. The total amount of players drafted is determined by the commissioner and/or provider of any given league. In a 10 team league, Player #1 has the $1^{st}$ Overall Pick, Player #2 has the $20^{th}$ Overall Pick and Player #3 has the $21^{st}$ Overall Pick.

In an auction format, each owner elects one player to be bid on for each round of the draft. The salary cap and roster limits are determined by the commissioner and/or provider of each league before draft day. Owners must draft full rosters based on each leagues salary cap. The following presents an exemplary salary cap for teams in an auctions: 10 Team League, Player #1 has $1,000, Player #2 has $500, Player #3 has $700, and Player #4 has $200.

In an auto draft, the players are added to a Fantasy Owners Roster based on a predetermined value.

The number of teams is determined by the commissioner and/or provider before the beginning of each fantasy season. The number of teams that is recommended to play based on this format is at least two, and preferably between 2-100 teams. The most preferred based on the most ideal player pool for each respective fantasy league, is an 8, 10, 12, and/or 14 fantasy team league.

Generally, an owner drafts 3 Centers, 5 Forwards, & 5 Guards. Two injured reserve slots are available to players who are listed by their NBA team as "Injured Reserve," thereby allowing the Fantasy Owner to have as many as 15 full time players on their active roster. Player Pools are determined by each respective commissioner, however the NBA player pool is recommended for usage only. Guards are between 6'7 or below in feet and eligibility at guard depends on being listed in the NBA as a "Point Guard," "Shooting Guard," or "Small Forward." Forwards are 6'5 feet tall or above and are also listed in the NBA as a "Shooting Guard" "Small Forward" or "Power Forward." Centers are 6'10 feet tall or above and will be listed in the NBA as a "Power Forward" or "Center." All of these guidelines are established by each individual commissioner and/or provider.

All lineups are due before tip-off. If an owner forgets to hand in a line-up the owner can start the same players as the owner started the game before. There are two ways in submitting a lineup. The owner either pick the night the player plays or not specify. In the event that you do not state what night the player plays; the player stats are calibrated (i.e., calculated or determined) based on the first moment he steps onto the basketball court. Those will be the stats used. A team starts 1 Center, 2 Forwards, 2 Guards, 1 sixth man, and a reserve player for two positions. All of these guidelines are established by each individual commissioner and/or provider.

Regular Season games are played over two day period. The days all our games are played are Tuesday-Wednesday and Friday-Saturday. In this example, there must be at least a minimum of 15 NBA games played over a two day period. Fantasy Playoff games are played over a three day period. The days playoff games fall on are Friday-Sunday and/or Monday-Wednesday. The number of games in any given year changes based on how many games all owners agree to play. Usually there is between 20-30 Regular Season games that are scheduled for each fantasy season. Fantasy Playoffs are usually 5 rounds long. The fantasy season ends two weeks before the NBA regular season ends. This is done to prevent NBA players from being rested and/or benched by their NBA teams for precautionary reasons. All of these guidelines are established by each individual commissioner and/or provider.

Shown below is an example of how 1 fantasy game is played over a two day format. 2 Guards, 2 Forwards, 1 Center, and 1 $6^{th}$ man are used in this example below.

Example:

| Position | Player | Fri | Sat | Box Score | Fantasy Score |
|---|---|---|---|---|---|
| TEAM #1 | | | | | |
| Center | Andrew Bogut (Utah) | X | | 20pts 10reb, 3blks | 39.5 |
| Forward | Charlie Villaneuva (UCONN) | | X | 15pts 9reb 2ast 2blks | 30 |
| Forward | Marvin Williams (NCU) | | X | 20pts 20rebs 4blks | 56 |
| Guard | Deron Williams (ILU) | X | | 12pts 12ast 4stl | 35 |
| Guard | Chris Paul (Wake Forest) | X | | 50pts 3ast 3reb 4stl | 68 |
| 6th Man | Raymond Felton (NCU) | | X | 25pts 5ast 5reb 1stl 1blk | 38 |
| | | | | TOTAL | 266.5 |
| TEAM #2 | | | | | |
| Center | Channing Fry (AZU) | X | | 15pts 10rebs 4blks | 36 |
| Forward | Ike Diogu (AZSU) | X | | 20pts 5rebs 5ast 2blks | 33 |
| Forward | Sean May (NCU) | | X | 15pts 15rebs 5ast 3blks 2stl | 47.5 |
| Guard | Antoine Wright (TX A&M) | | X | 10pts 15ast 4reb 2stl | 37 |
| Guard | Danny Granger (NMU) | X | | 20pts 10ast 5reb 2stl | 43 |
| 6th Man | Hakim Warrick (Syracuse) | X | | 20pts 12ast 10reb 3stl | 56.5 |
| | | | | TOTAL | 253 |

| BOX SCORE | |
|---|---|
| | GAME |
| TEAM #1 | 266.5 |
| TEAM #2 | 253 |

| STANDINGS | | |
|---|---|---|
| | RECORD | TOTAL POINTS |
| TEAM #1 | (1-0) WIN/LOSS | 266.5 |
| TEAM #2 | (0-1) WIN/LOSS | 253 |

This example includes an alternative way to score points. Each individual statistic can be played against each fantasy opponent. The Fantasy team with the most points in a statistical category receives 1 point. Even though this is only illustrated for basketball in this example, this can be applied to all sports on this application.

Example:

| | Points | Assists | Rebounds | Blocks | Steals |
|---|---|---|---|---|---|
| Team #1 | 142 | 22 | 47 | 10 | 9 |
| Team #2 | 100 | 47 | 39 | 9 | 6 |
| Team #1 | 1 | 0 | 1 | 1 | 1 |
| Team #2 | 0 | 1 | 0 | 0 | 0 |

| Standings | | |
|---|---|---|
| | Record | Total Points |
| Team #1 | (1-0) | 4 |
| Team #2 | (0-1) | 1 |

Generally Commissioners and/or Providers also decides on the number of starters, bench sizes and value of each statistic (bonus options) used by any given league. With respect to transactions, all Free-Agents are eligible for bidding. There is a league defined minimum bid for a player, whether you get the player or not. Players bided on are add to the opponents roster the day before the next game. A team is allowed to place a 1 Game contract on a player for an established price. After that player has played out his one game contract, the player must be dropped. A Salary Cap is in place, and if a team goes over the salary cap, the team is fined for each dollar you go over. Each player traded is associated with a dollar value. For each player switched out of one position to another position (for eligible players only), there is a cost. Leagues can also allow their owners to pick up players via a waiver wire where each week a Fantasy Owner has first right on the Free-Agent Pool. All of these guidelines are established by each individual commissioner and/or provider.

Example 9

Obtaining Statistical Data from Statistics Provider

In accordance with the present invention, a Major League Baseball fantasy league is established by a commissioner for twelve owners and a corresponding twelve teams on a computer server available through the Internet. Owners submit information regarding line ups to the commissioner.

Players selected in the line ups perform in real life. The statistics for each player performing in real life games are tabulated by the statistical provider or a party that has agreed to provide the tabulations to the statistical provider. The statistical provider further provides the statistical data to the fantasy league through an Internet-based server that communicates with the server hosting the fantasy league. Statistics for each player in the Owners' line up is provided in real time.

Owner's access real time statistics by accessing graphical user interfaces (GUI) on software for the owner's to access the league website. The statistics for each player are provided for each player. The system converts the raw statistical data from the real life performance by the player into the equivalence values for the fantasy league based on the league scoring rules. For example, Cal Ripken has 4 RBI, a home run, 2 runs scored, and 2 hits. In the league, an RBI, a run, and a hit is worth one point, and a home run is worth four points. The GUI presents the fantasy league score for Cal Ripken as 12 points.

Example embodiments of the present invention have now been described in accordance with the above advantages. It will be appreciated that these examples are merely illustrative of the invention. Many variations and modifications, such as statistics used and methods of conducting a fantasy league, will be apparent to those of ordinary skill in the art without departing from the systems and methods disclosed and taught by the present invention. The present invention may be applied to any actual sport, whether professional, collegiate, or amateur, taking place with a multiple game or match schedule, whether or not there is a professional or amateur league, including, but not limited to cricket, rugby, tennis, auto sports, bowling, etc.

What is claimed is:

1. A method of playing a fantasy sport comprising:
implementing a fantasy sports league using software stored on a computer readable medium of one or more computers, the fantasy sports league having a plurality of fantasy owners, each owning a fantasy team with one or more fantasy players corresponding to one or more real-life players;
wherein an actual, statistical performance of the real-life player corresponds to fantasy points of the fantasy player;
wherein the fantasy season is divided into a plurality of scoring periods, each period covering at least two scheduled real-life games, in which points of an owner's fantasy player in a starting line-up accrue toward a total score of the fantasy team;
on or before the commencement of the chronologically earliest scheduled game in each scoring period, providing the fantasy owner using the software with functionality to activate the one or more fantasy players having a starting opportunity in at least two games in an individual scoring period;
allowing the fantasy owner to select a particular one of the fantasy players for placement in the starting line up to start for the fantasy owner within the individual scoring period in a first game, but not in a second game, from among plural games of that fantasy player within the individual scoring period;
whereby the software limits the owner from selectively activating and accruing points from that particular fantasy player in every game in the scoring period in which that particular fantasy player has starting opportunities;
whereby the software prevents the owner from activating the player for the second game in the individual scoring period in response to the owner activating the player for the first game; and
adding and displaying each fantasy owner's points accrued in past scoring periods to track competitive rankings within the league.

2. The method of claim 1, wherein the number of games in each individual scoring period ranges from 2 to 14.

3. The method of claim 2, wherein the number of games in each individual scoring period ranges from 3 to 8.

4. The method of claim 1, wherein the first game and the second game in the period do not relate to a sequential, chronological order of the games during the scoring period.

5. The method of claim 4, further comprising:
providing the functionality to activate the fantasy player for at least a third game within the scoring period at the same time as the opportunity to activate the fantasy player for the first game.

6. The method of claim 1, wherein the number of scoring periods is at least 2.

7. The method of claim 6, wherein the number of scoring periods is greater than or equal to 10.

8. The method of claim 7, wherein the number of scoring periods is greater than or equal to 20.

9. The method of claim 1, wherein each fantasy owner's points accrued in past scoring periods to track competitive rankings within the league are displayed electronically.

10. The method of claim 1, the number of games in each scoring period is not uniform.

11. The method of claim 1, wherein the fantasy sports league comprises one or more fantasy sports: basketball, baseball, auto-racing, soccer, football, hockey, ice hockey, volleyball, golf, racing, tennis, ice hockey, motor racing, cricket, rugby or bowling.

12. The method of claim 11, wherein the fantasy sport is selected from one or more professional, collegiate or amateur sports leagues or a combination thereof.

13. The method of claim 12, wherein the fantasy sport is selected from American professional basketball.

14. The method of claim 11, wherein the sport is selected from one or more professional or national associations in the geographic areas comprising England, United Kingdom, Germany, Spain, Portugal, France, Italy, The Netherlands, Scotland, Turkey, Austria, Sweden, Finland, Russia, Ukraine, Greece, Ireland, Brazil, China, Mexico, Argentina, Norway, Chile, Paraguay, Colombia, Bolivia, Venezuela, Poland, Japan, India, Korea, Malaysia, Australia, Canada, North America, Europe, Asia, Africa and South America.

15. A system for playing a fantasy sport, comprising:
a fantasy sports league implemented using software stored on a computer readable medium of one or more computers, the fantasy sports league having a plurality of fantasy owners, each owning a fantasy team with one or more fantasy players, corresponding to one or more real-life players;
wherein an actual, statistical performance of the real-life player corresponds to the fantasy points of the fantasy player;
wherein the fantasy season is divided into a plurality of scoring periods, each period covering at least two scheduled real-life games, in which points of an owner's fantasy player in a starting line up accrue toward a total score of the fantasy team;
wherein the fantasy sports league is further configured to provide, on or before the commencement of the chronologically earliest scheduled game of each scoring period, a fantasy owner with functionality to activate the one or more fantasy players having a starting opportunity in at least two games in an individual scoring period for placement in the starting line up in a first game but not in a second game from among plural games of that fantasy player within the individual scoring period;
whereby the software limits the owner from selectively activating and accruing points from starting that particular fantasy player in every game in the scoring period in which that particular fantasy player has starting opportunities;
whereby the software prevents the owner from activating the player for the second game in the individual scoring period once the owner activates the player for the first game; and
wherein the fantasy sports league is further configured to add and display each fantasy owner's points accrued in past scoring periods to track competitive rankings within the league.

16. A tangible memory medium, wherein the tangible memory medium stores program instructions which are executable to perform a method for playing fantasy sports, the method comprising:
implementing a fantasy sports league using software stored on a computer readable medium of one or more computers, the fantasy sports league having a plurality of fantasy owners, each owning a fantasy team with one or more fantasy players, corresponding to one or more real-life players, wherein an actual, statistical performance of the real-life player corresponds to a fantasy performance of the fantasy player;

wherein the fantasy season is divided into a plurality of scoring periods, each period covering at least two scheduled real-life games over at least two days, in which points of an owner's fantasy player in a starting line-up accrue toward a total score of the fantasy team;

providing a fantasy owner using the software, on or before the commencement of the chronologically earliest schedule game in each scoring period, with functionality to activate the one or more fantasy players having a starting opportunity in at least two games in an individual scoring period for selection into the starting line up for the fantasy owner within an individual scoring period for a first game, but not for a second game, from among plural games of that fantasy player within the individual scoring period;

whereby the software limits the owner from selectively activating and accruing points from starting that particular fantasy player in every game in the scoring period in which that particular fantasy player has starting opportunities;

whereby the software prevents the owner from activating the player for the second game in the individual scoring period once the owner activates the player for the first game; and adding and displaying each fantasy owner's points accrued in past scoring periods to track competitive rankings within the league.

* * * * *